(12) United States Patent
Aisenberg

(10) Patent No.: US 7,200,416 B2
(45) Date of Patent: Apr. 3, 2007

(54) GROUP SPECIFIC SIMPLIFIED CELLULAR TELEPHONES

(76) Inventor: Alain Aisenberg, 3615 NE. 107th St., #3312, Aventura, FL (US) 33180

( * ) Notice: Subject to any disclaimer, the term of this patent is extended or adjusted under 35 U.S.C. 154(b) by 782 days.

(21) Appl. No.: 10/384,155

(22) Filed: Mar. 7, 2003

(65) Prior Publication Data

US 2004/0185895 A1 Sep. 23, 2004

(51) Int. Cl.
*H04B 1/38* (2006.01)
*H04M 1/00* (2006.01)

(52) U.S. Cl. ............. 455/550.1; 455/90.3; 379/433.06; 379/433.1

(58) Field of Classification Search ................ 379/368, 379/433.06, 433.07, 433.1; 455/347, 410, 455/411, 418, 550.1, 565, 90.3
See application file for complete search history.

(56) References Cited

U.S. PATENT DOCUMENTS 6,662,023 B1 * 12/2003 Helle .......................... 455/558
6,826,120 B1 * 11/2004 Decker et al. ................ 368/10
6,836,654 B2 * 12/2004 Decotignie .................. 455/410
6,912,399 B2 * 6/2005 Zirul et al. .................. 455/463

* cited by examiner

*Primary Examiner*—Bing Q. Bui
(74) *Attorney, Agent, or Firm*—Malloy & Malloy, P.A.

(57) ABSTRACT

A group specific communication assembly such as a telephone assembly which is operative to appeal to anyone or all of specific groups of individuals such as, but not limited to, children, teenagers, the elderly, the visually challenged or hearing impaired, the chronically ill, etc. A programmable control assembly includes a plurality of control members which are structured for selective operation of the telephone assembly, such that activation of at least some of said plurality of control members comprise dialing buttons selectively operable by a user to define a limited access operation. At least some of said plurality of control members being disposed in cooperative relation to corresponding ones of a plurality of windows to at least partially define a predetermined display which may be configured to represent facial characteristics applicable to a younger group of users.

38 Claims, 25 Drawing Sheets

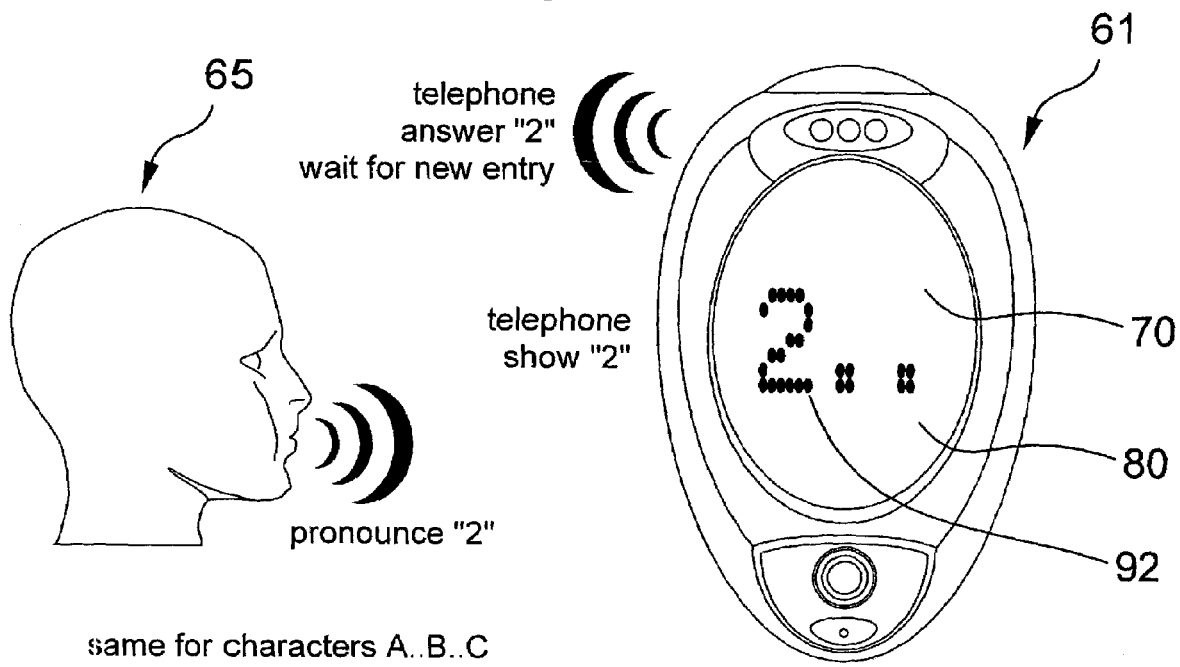
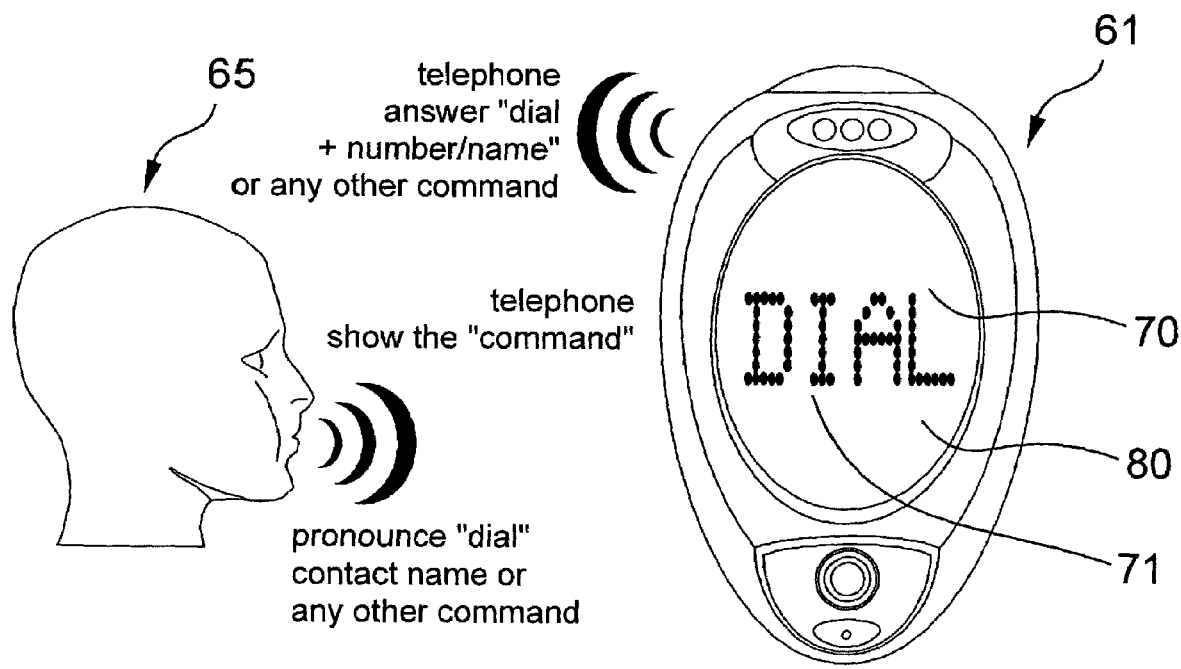

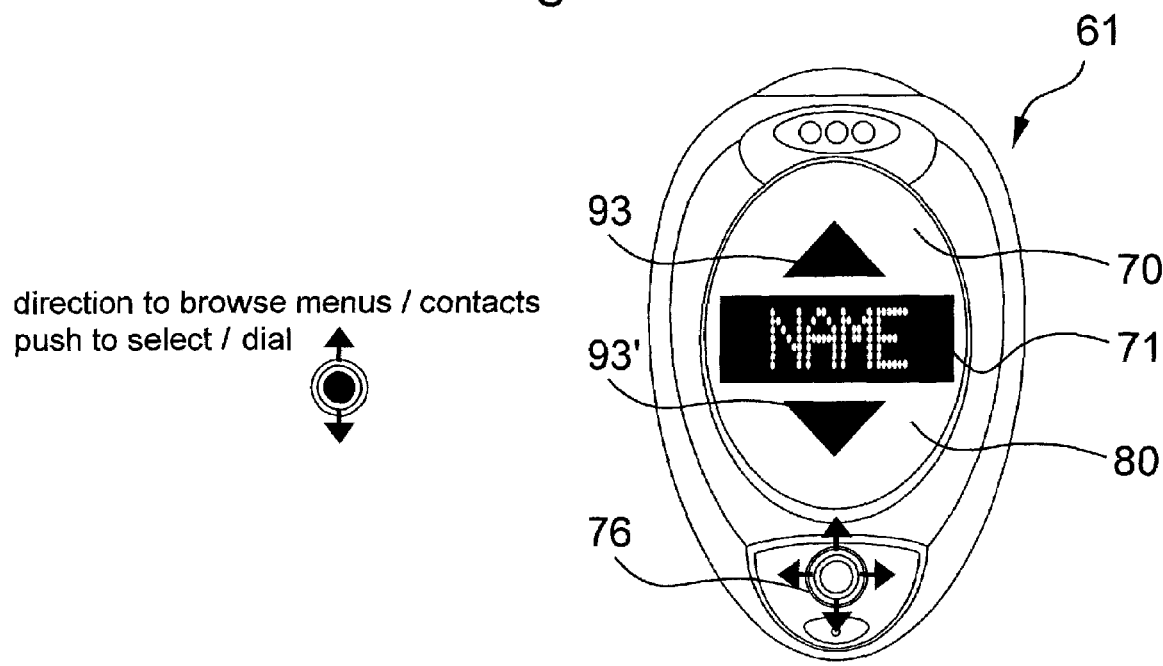
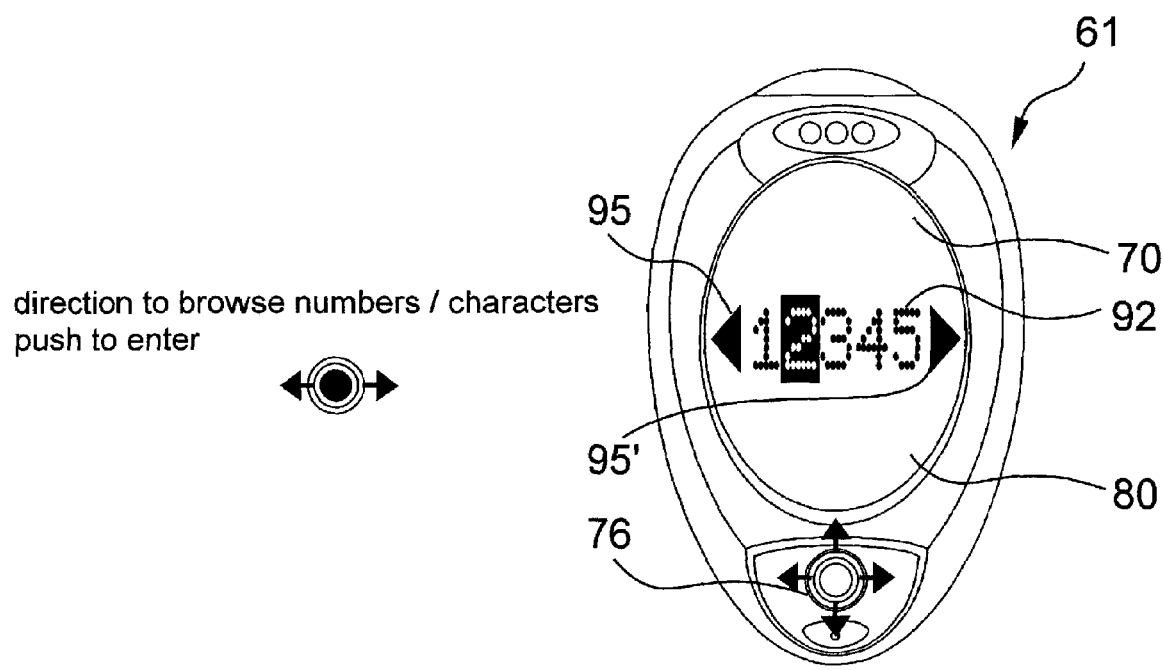

telephone dial programmed number and read prerecorded vocal emergency message telephone store medication or receive medication list and schedule from MD and remind the user by showing alerts

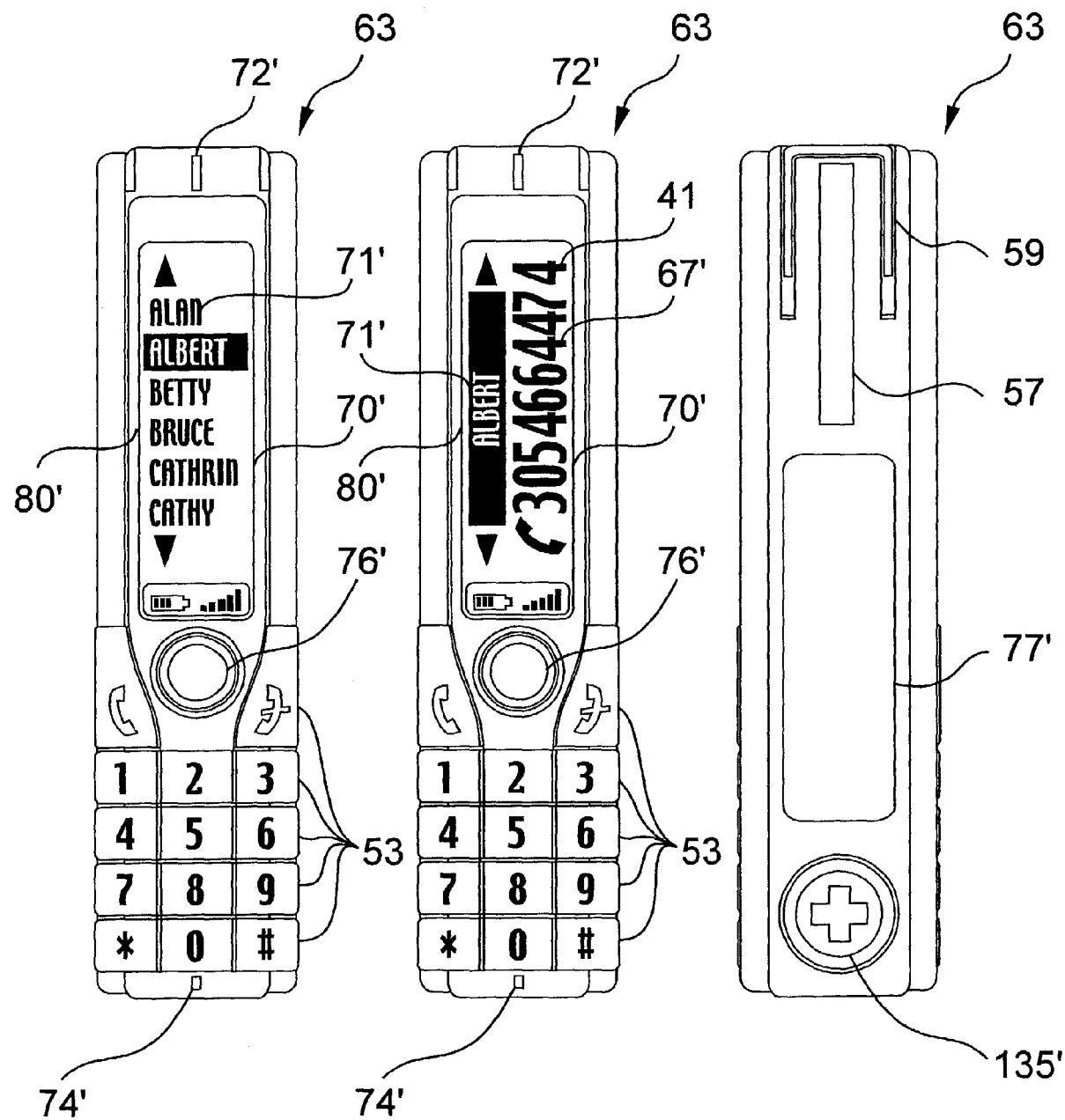

GROUP SPECIFIC SIMPLIFIED CELLULAR TELEPHONES

BACKGROUND OF THE INVENTION

1. Field of the Invention

A limited access telephone or other communication assembly comprising various structural modifications each intended to appeal to and be used by at least one specific group such as, but not limited to, kids, seniors, students, physically challenged, etc. Speech recognition, multidirectional scrolling, auto/speed dialing, emergency service communication links and pre-programmed identifiable, predetermined calling entities are included dependent, at least in part, on the specific groups being targeted.

2. Description of the Related Art

The use of mobile/cellular telephones has become a common practice throughout virtually all modern or industrialized countries of the world. The popularity of mobile telephone usage has expanded to the point where certain geographical areas require that additional digits, such as those numbers representing area codes, be added to previously existing telephone numbers in order that a sufficient quantity of telephone numbers are available. In typical fashion, a mobile and/or cellular phone is extremely small and preferably dimensioned and configured to easily fit within a pocket, purse, etc. of the user. Further, conventional structural and operational features of modern mobile phones include a display device and a plurality of operational keys, each representing a numerical digit and/or letter, wherein the plurality of keys are manually operable to reach a calling number.

The advancements in modern day communication technology is most evident in the reduction in size as well as the operational versatility and performance capabilities of the newest category of mobile phones. Mobile phones are now capable of communicating not only with other telephones but with computers, processors, personal digital assistants (PDA), as well as being equipped to communicate directly with the Internet. Also, technological advancements have allowed the modification of mobile phones, in at least one category, to be more simply operated, such as by having a "limited access" incoming and out going communication. These types of limited access phones are particularly adaptable for use by children, the elderly, physically or emotionally impaired individuals and others who do not desire or require the use of a mobile telephone having a full range of communication capabilities, as set forth above.

The increasing popularity of mobile telephone usage and the above noted continuing advancements in communication technology have also served to lower the cost of mobile telephones, making them even more popular to a wider range of consumers. At the same time the prolific use of mobile telephones have rendered them a greater target for theft and/or misuse. In the latter category there is an increasing concern about problems of controlling extravagant and unnecessary telephone usage of mobile telephones by younger adults and/or children. Resulting modifications of mobile telephones include the ability of a parent or other authorized personnel to provide communication blocks or other limiting characteristics on the use of the telephone. However, it is well recognized that communication, especially in emergency situations between a parent and child or other related individuals is essential in today's socially and politically unstable environment.

Further, in an attempt to reduce the theft of mobile telephones, especially those in the possession of children, "limited access" phones, of the type set forth above, are becoming more prevalent. Telephones of this type may be structured to only contact a limited number of predetermined telephone numbers, such as a person's home, individuals; such as a person's family or friends and emergency locations; such as medical facilities, police, etc. In use, children or other individuals in possession of such telephones merely need to press a single dialing button or control member for contact with a designated, predetermined calling number. In addition to reducing theft, these types of phones also reduce unnecessary and unauthorized extravagant telephone usage which result in high telephone bills.

SUMMARY OF THE INVENTION

The present invention is directed to a communication assembly which, in at least one preferred embodiment, comprises a mobile telephone and in other preferred embodiments may comprise a telephone in combination with one or more additional communication devices such as a telephone/radio combination, speaker phone, game playing application, etc. Also, the various preferred embodiments of the present invention may include a variety of specialized operating features including, but not limited to, voice recognition and command capabilities, automatic and/or speed dialing, pre-recorded (emergency) message transmission, browsing and scrolling features, enhanced visual display, and medical characteristics determination and transmission.

In addition, the communication assembly of the various preferred embodiments of the present invention can be generically referred to as "limited access" communication devices by virtue of the fact that they are specifically structured to have a predetermined communication or calling "menu". More specifically, in at least one preferred embodiment of the communication assembly in the form of a cellular telephone, only a predetermined, limited number of telephone numbers can be called. Similarly, in at least one additional preferred embodiment of the present invention, the telephone assembly can only receive calls from the same number of preset calling numbers. Further, the subject telephone assembly, as well as any other communication device used in combination therewith, includes appropriate communication technologically to preset, program and re-program a given limited quantity of telephone numbers which, as set forth above, may be called or wherein telephone communication may be received from these calling numbers.

More specifically, a telephone assembly comprising at least one preferred embodiment of the present invention includes a casing including an exposed cover plate. The cover plate may be fixedly connected to the casing. Alternately and more preferably, the cover plate may be removably connected to the casing and as such may represent one of a plurality of replaceable cover plates. Each cover plate may be individually attached to the casing so as to provide a different decorative appearance as well as possibly alter the functional characteristics of the telephone assembly, as further described hereinafter. The cover plate comprises a plurality of windows extending therethrough. Each of the windows has a predetermined, distinct size and configuration which provide, when collectively viewed, a predetermined display which is not only decorative but which may be specifically structured to appeal to one or more groups of consumers and/or potential users, such as children.

In addition, the telephone assembly of the present invention comprises a control assembly including a plurality of control members disposed on the casing. The plurality of control members are structured for the selective operation of the telephone assembly including features such as dialing and programing or re-programing the memory and accessing any storage capabilities of the telephone assembly of the present invention. As such, at least some of the plurality of control member may be generically defined as dialing buttons. Manipulation of the control members serves to answer an incoming call from a pre-set, designated an identifiable entity or alternatively serves to initiate a call to the same entity at a preset telephone number. In addition, others of the control members may comprise one or more function buttons, wherein various applications or other operational capabilities of the telephone may be controlled and regulated. Operation of the function buttons by a predetermined manipulation thereof may occur either independently of or in combination with the aforementioned dialing buttons, as also to be explained in greater detail hereinafter.

Another feature of the present invention is the dimensioning and configuring of at least some of the plurality of control members to correspond to predetermined ones of at least some of the plurality of windows. In doing so, the control members are structured to be selectively accessible through a corresponding one of the plurality of windows. More specifically, this category of control members are movably mounted within corresponding ones of the windows, such that the manipulation thereof serves to either initiate or receive communication to or from a pre-set calling number. Actual manipulation of the control members may include one or more depressions being exerted thereon. It is also noted that others of the plurality of control members, above designated as one or more function buttons, may be disposed on the casing in spaced, relation to the plurality of windows and operable, by manipulation, by exerting a similar pushing force thereon.

Accordingly, each of the plurality of dialing buttons may be specifically structured with the operational components of the telephone assembly to initiate communication to individual, preset numbers being called. As indicated above, each of the numbers called are pre-set into the memory function of the telephone assembly to the extent that manipulation of any given dialing button only results in the initiation of a telephone call to that pre-set number. At the same time each of the dialing buttons may initiate receipt of an in coming call by manipulation thereof in the manner set forth above, but only from that preset calling number.

By way of example only, a telephone assembly representative of a preferred embodiment of the present invention may be designed for limited access use by a child or other individual. As such, one of the dialing buttons may be programmed with a preset calling number representative of the home of the child. As a result the child, wishing to initiate a telephone call to his or her home merely manipulates the designated dialing button for the home telephone number. Similarly, receipt of an incoming call from the home will be indicated by visual or audible activation of the one dialing button representative of the home telephone number. The incoming call can be completed by the child or other individual manipulating the single dial button associated with the home telephone number.

As set forth above, the control assembly; particularly including at least some of the plurality of control members such as, but not limited to, the dialing buttons are cooperatively structured with at least some of the plurality of windows so as to collectively represent a predetermined visual display. As also indicated above the visual display may be specifically designed to appeal to a segmented group of potential consumers or users. Further by way of example only, the telephone assembly of the present invention can be designated a "kid phone". As such, the predetermined visual display may comprise facial characteristics, wherein such facial characteristics may be more specifically representative of a predetermined, particular type of face, such as but not limited to a clown face. Therefore, one viewing the exposed frontal portion of the cover plate will be provided with a clear visual impression of a face which may be in the form of a clown or other category of faces. This decorative and functional aspect of the cover plate of the casing of the telephone assembly of the present invention therefore not only enhances the overall appearance of the telephone assembly but possibly renders it more appealing to a group of individuals (children) which the facial characteristics were intended to impress.

It is emphasized that the predetermined display defined at least in part by the plurality of windows and/or corresponding plurality of control members are not necessarily limited to facial expressions or characteristics. Other predetermined displays can be demonstrated in order to appeal to a preselected other group of potential consumers. In addition, the various characteristics of the predetermined display may comprise components of the casing and/or cover plate other than the aforementioned plurality of windows and corresponding control buttons. By way of example, such other operative components included within the telephone assembly of the present invention comprise a speaker, microphone, antenna, signal lights, etc. All of the aforementioned operative components, and possibly a variety of others may all be collectively disposed, configured, dimensioned and generally structured into an array which defines the aforementioned predetermined display, whether or not that display is intended to represent facial characteristics and/or a clown face.

Yet another preferred embodiment of the present invention may include a communication assembly which is not necessarily limited to or inclusive of a telephone assembly. As such, the communication assembly includes many of the operative and structural features of the previously set forth predetermined embodiments specifically defined by the telephone assembly. Moreover, the preferred embodiment defining a communication assembly may include a casing including a cover plate mounted thereon in an exposed position. In addition, a control assembly including at least one control member is disposed and structured to operate the communication assembly. The cover plate includes at least one window cooperatively structured and disposed with the one control member to facilitate visual and physical access thereto. A display assembly is associated with the at least one control member and structured to display identifying indicia representative of a predetermined entity.

The display assembly may include a display screen, integrated into the one control member and structured to display certain identifying indicia. As such, the identifying indicia may comprise a pictorial display of a predetermined entity viewable on the display screen. Further, the predetermined entity is intended to represent an incoming caller identity. Therefore, common to both of the at least two preferred embodiments of the present invention is the inclusion of some type of viewable, identifying indicia which may assume a variety of logos, descriptive words, pictorial representations, informational displays, etc. Such identifying indicia is intended to be indicative or representative of a particular intended calling number and/or a particular caller initiating an incoming communication.

As should be apparent, all of the preferred embodiments of the present invention facilitate use and operation of a limited access telephone assembly or other communication assembly in a manner wherein the aesthetic appearance thereof may be intended to appeal to any of a large number of consumer categories or segments, thereby further enhancing the popularity of the telephone or communication assembly of the present invention.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 26 is a composite view in at least partially schematic form incorporating speech recognition and verification capabilities for facilitated use by the hearing impaired.

FIG. 27 is a composite view in at least partially schematic form of yet another preferred embodiment of the present invention similar to that of the embodiment of FIG. 26 incorporating speech recognition and verification capabilities.

FIG. 28 is a composite view in at least partially schematic form of yet another preferred embodiment of the communication assembly of the present invention incorporating diverse browse and scrolling features for accessing stored data.

FIG. 29 is a composite view in partial schematic form similar to the embodiment of FIG. 8 by including browsing and selection features for entering data in storage facilities of the preferred communication device.

FIG. 37 is a front view of yet another preferred embodiment of the present invention comprising a telephone assembly in a structurally distinguishable case from the previously set forth embodiments.

FIG. 37A is a front view of the embodiment of the FIG. 37 including a display structure having variably oriented data displayed thereon.

FIG. 37B is a rear view of the embodiment of FIGS. 37 and 37A.

Like reference numerals refer to like parts throughout the several views of the drawings.

DETAILED DESCRIPTION OF THE PREFERRED EMBODIMENT

Figure 1:
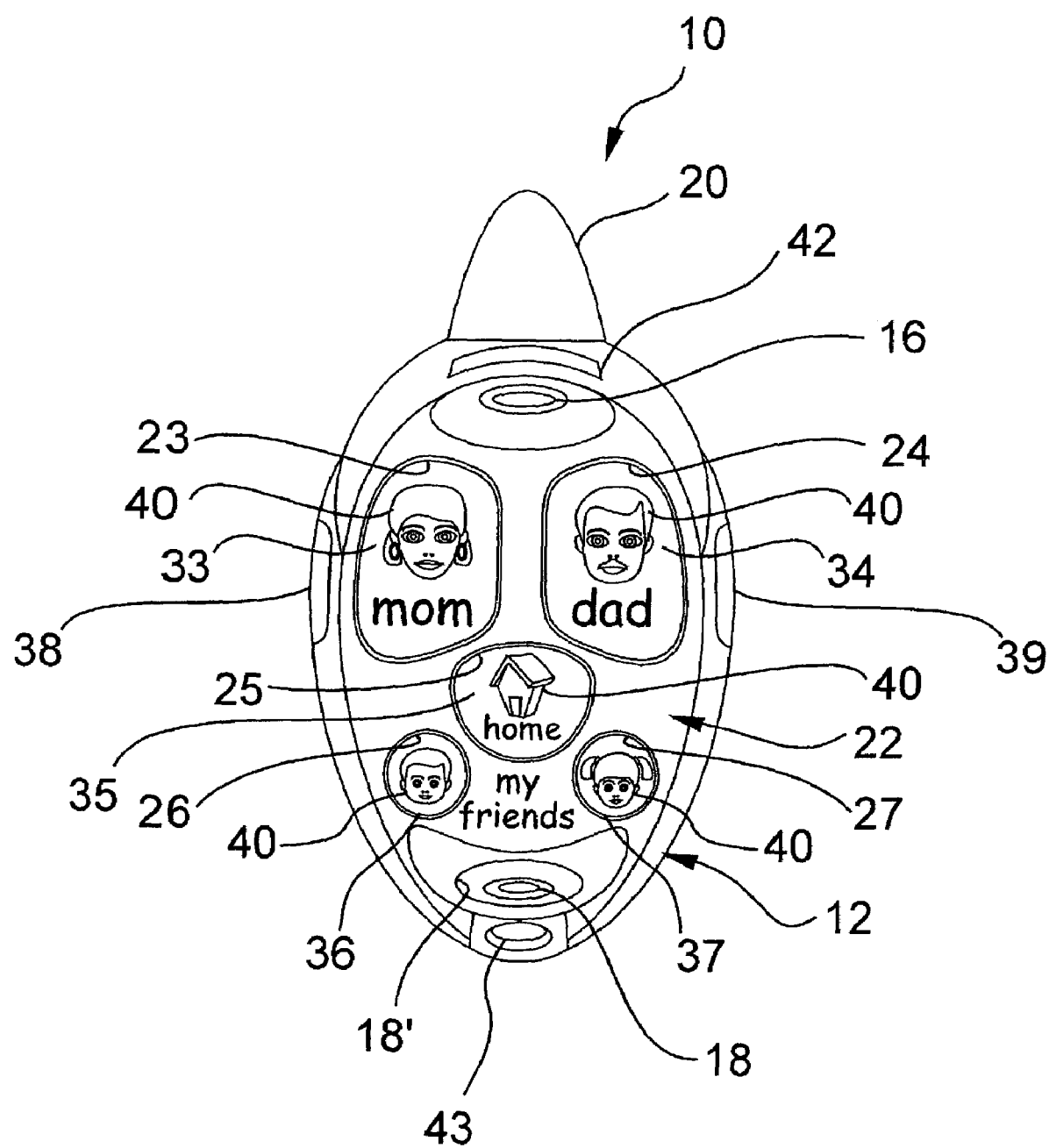
FIG. 1 is a front view of one preferred embodiment of a telephone assembly of the present invention.
Figure 2:
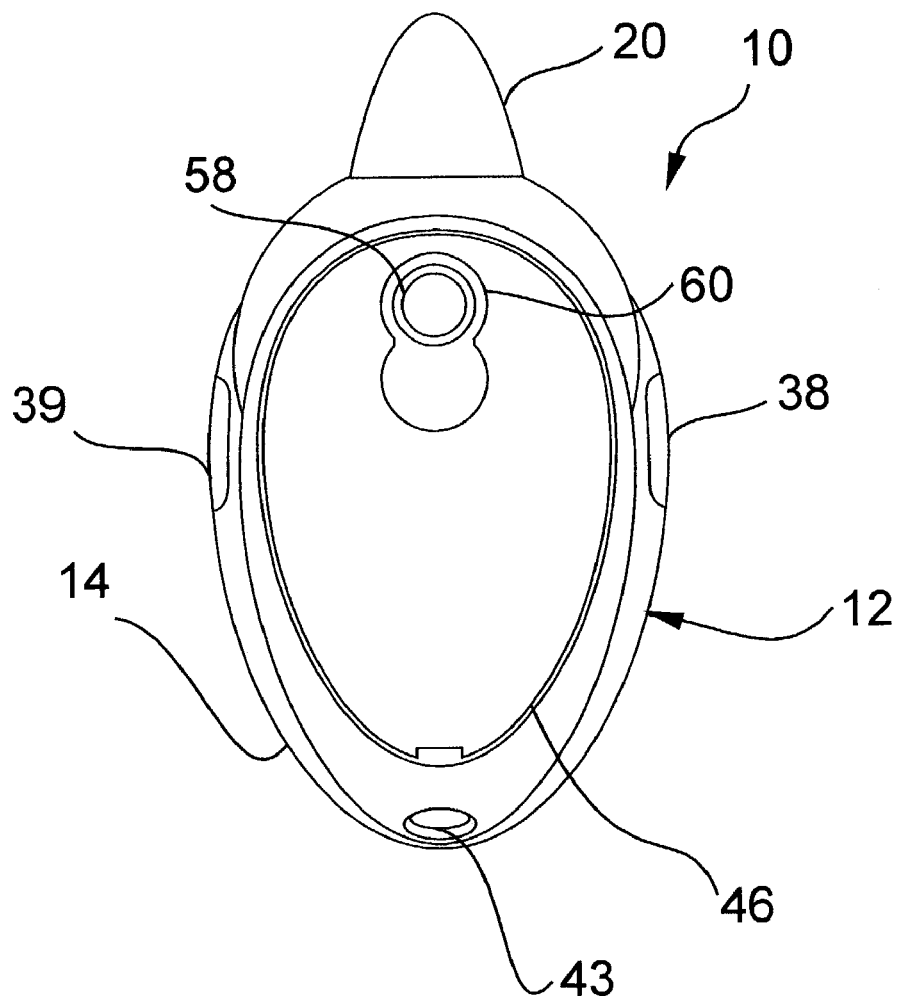
FIG. 2 is a rear view of the embodiment of FIG. 1.

As shown in the accompanying Figures, the present invention relates to a communication assembly generally indicated as 10. As will be described in greater detail hereinafter, the present invention may include other communication assemblies, such as the modified telephone assemblies of the embodiments of FIGS. 1 through 7 as well as communication assemblies in various forms having unique structural and operative features as demonstrated in the remaining FIGS. 8 through 37.

More specifically, and with primary reference to FIGS. 1 through 7, one preferred embodiment of the communication assembly 10 of the present invention includes a telephone assembly generally indicated as 12. The telephone assembly 12 includes a casing 14 having an interior portion dimensioned and configured to house a plurality of operative communication components including one or more micro processors, memory functions, and adequate communication facilities to accomplish mobile telephone communication. Further, the telephone assembly 12 comprises a mobile/cellular telephone and includes a speaker 16 a microphone 18 and an antenna 20.

The telephone assembly 12 further comprises a cover plate 22 mounted on the casing 14 in an exposed, frontal orientation as shown in FIG. 1. The cover plate 22 comprises a plurality of windows extending completely therethrough, wherein the plurality of windows are designated as 23, 24, 25, 26 and 27. Each of the windows will be described in greater detail hereinafter with related reference to a control assembly. The control assembly includes a plurality of control members disposed on the casing 14 and structured for selective operation of the telephone assembly 12 to accomplish the desired communication functions, common to mobile/cellular telephones.

More specifically, the plurality of control members comprise a plurality of dialing buttons 33, 34, 35, 36 and 37. It is emphasized that the number of windows as well as the number of control members may of course vary dependent on the quantity of calling telephone numbers to which the telephone assembly 12 may initiate communicative access and from which the telephone assembly 12 may receive incoming calls. The plurality of windows 23 through 27 are correspondingly configured and dimensioned with respective ones with the plurality of control members or dialing buttons 33 through 37. As such, each of the dialing buttons 33 through 37 may be visually and physically accessed through the respective ones of the windows 23 through 27. Physical access herein comprises the ability of a user to depress or to exert a pushing force on each of the dialing buttons 33 through 37 in order to accomplish activation of the telephone assembly 12 in the form of initiating a call or receiving an incoming call.

As indicated above, the telephone assembly 12 comprises a "limited access" telephone meaning that only a predetermined, preset quantity of telephone numbers are programmed into the memory facility of the telephone assembly 12. In at least one embodiment the limited access capabilities of the telephone assembly 12 may be further characterized by the fact that only the preset telephone numbers in memory may initiate calls received by the telephone assembly 12. However, as discussed hereinafter, other embodiments are structured to receive calls from "unlisted" numbers. Accordingly, the limited access capabilities of the telephone assembly 12 provide for the elimination of any type of conventional key pad or alpha-numerical designated dialing buttons, as is typically found on conventional mobile telephones.

Further, each of the dialing members or buttons 33 through 37 may include identifying indicia, each represented by the reference numeral 40 for purposes of clarity. The identifying indicia 40 is representative or indicative of an entity associated with the preset, predetermined calling number associated with each of the individual dialing buttons 33 through 37. More specifically, and by way of example, the identifying indicia in the plurality of dialing buttons 33 through 37 may include a drawing, icon, pictorial display, written description, etc. representative of a particular entity. As shown in FIG. 1 such identifying indicia includes "mom", "dad", "friend" and "home". It is of course emphasized that the identifying indicia 40 may vary extensively depending, to at least some extent, on the individual or category of individuals with which a particular telephone assembly 12 is programmed to communicate. Further by way of example, the identifying indicia 40 could represent business colleagues, office or headquarters, customers, etc.

Also, each of the plurality of calling buttons 33 through 37 may be effectively illuminated, such as by being back lighted. Also, a notification of an incoming call could be first indicated by a signal device 42 in the form of one or more LED displays. Concurrently or subsequently one of the plurality of dialing buttons 33 through 37 would become visually apparent, such as by the aforementioned illumination facilities, indicating to the user of the telephone assembly 12 which entity is attempting to initiate an incoming call. If the individual in possession of the telephone assembly 12 was being called by a home entity or location, the dialing button 35 would be illuminated or otherwise become visually apparent. This would result in the user of the telephone assembly 12 manipulating the dialing button 35 by exerting a pushing force thereon. The pushing force would at least partially dispose the calling button 35 further into a recessed orientation relative to the corresponding window 25 and serve to activate the communication circuitry and/or operative components to complete the incoming call.

Similarly, initiation of an outgoing call by a user of the telephone assembly 12 would be quickly and easily accomplished by the user manipulating anyone of the dialing buttons 33 through 37 by exerting a similar type of pushing force thereon. Automatic "speed dialing" would occur through accessing the memory capabilities of the telephone assembly 12 whereby a telephone call would be directed only to the telephone number associated with a particular entity such as the mom, dad, home, friends, etc.

Additional structural and operative features of communication assembly 10, embodied in the telephone assembly 12 of FIG. 1 includes the aforementioned control assembly further comprising one or more function buttons as at 38 and 39. As should be apparent, the function buttons 38 and 39 are spaced from the plurality of windows 23 through 27 and are not operatively associated therewith in terms of function, control, etc. The function buttons 38 and 39 may be primarily structured, in combination with the communication circuitry and processor assembly on the interior of the casing 14, to program, pre-set, re-program and otherwise regulate processor, memory and access capabilities relative to the predetermined, pre-set telephone numbers which define the operative menu of the limited access telephone assembly 12 of the preferred embodiment of FIGS. 1 through 7 and others. In addition, one or more of the dialing buttons 33 through 37 may also includes certain "function" capabilities other than initiating activation of an outgoing telephone call or receipt of an incoming telephone call. Such additional function capabilities may include on/off, ring select, silent select, reset, etc.

Figure 6:
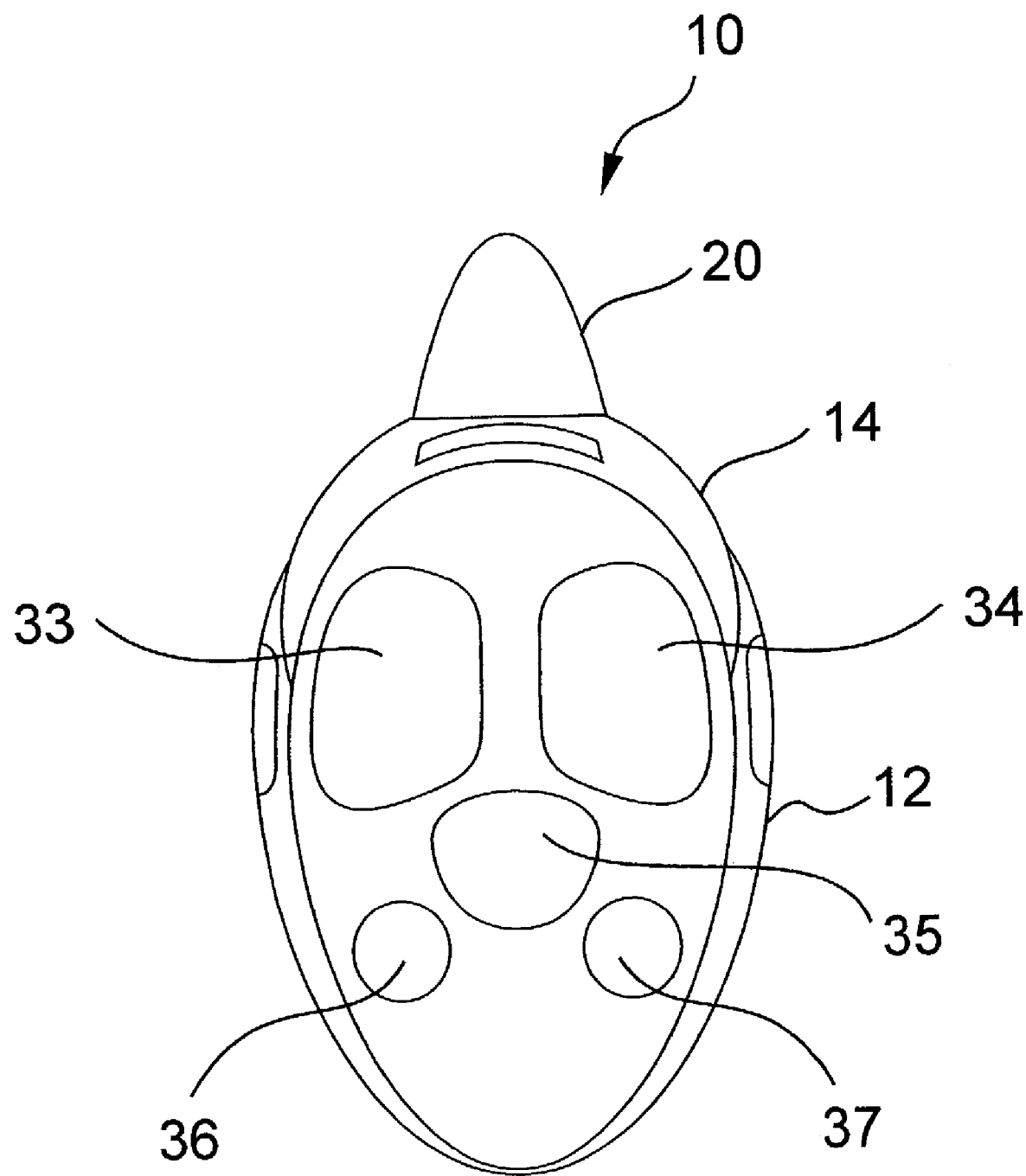
FIG. 6 is a front plan view of another preferred embodiment of the communication assembly of the present invention.

With primary reference to FIGS. 1 and 6, another feature of the present invention is the cooperative dimensioning, configuring, structuring and placement of at least some of the plurality of windows 23 through 27 in order to define a predetermined visual display. Similarly, at least some of the plurality of control members particularly, but not exclusively, including dialing buttons 33 through 37 are cooperatively disposed, dimensioned, configured and otherwise structured with corresponding ones of said plurality of windows 23 through 27 to define not only accessible positioning and manipulation of the dialing buttons 33 through 37 but also to at least partially define the aforementioned predetermined visual display.

Moreover, the predetermined visual display is further enhanced by the provision of the other viewable operative components including, but not necessarily limited to, the speaker 16, microphone 18, antenna 20, illuminated signal device 42, as well as the function buttons 38 and 39. In particular, the preferred embodiment clearly demonstrated in FIGS. 1 through 6 includes the collective and cooperative orientation of the plurality of windows 23 through 27, the microphone window 18' and the dialing buttons 33 through 37 define the predetermined visual display having facial characteristics. Even more specifically and by way of example, the facial characteristics can be more specifically representative of a clown face. The facial characteristics may be further enhanced by the antenna 20 representing a hat; the signal mechanism 42 representing hair, along with the speaker 16, the corresponding windows 23 and 24 and their associated dialing buttons 33 and 34 each being representative of eyes of the facial characteristics; the dialing button 35 and the associated window 25 being representative of a nose; the dialing buttons 36 and 37 and their associated windows 26 and 27 each being representative of cheeks of the indicated facial expression and microphone 18 and microphone window 18' configured to be representative of a smiling mouth portion of the facial expression. Also, an aperture 43 may be included to accommodate attachment of an accessory, as discussed with reference to FIGS. 7B and 7C. Naturally, a variety of other predetermined visual displays can be represented other than the characteristics of a facial expression. Further, the aforementioned illumination capabilities or back lighting features of each of the dialing members 33 through 37, which may be also included in the other control members of the control assembly, may further enhance the recognizable features of a facial expression or characteristics by displaying appropriate, predetermined colors.

With reference to FIGS. 1 through 4, and 7 other structural features of the telephone assembly 12 of the present invention may include a battery compartment 46 in which a self contained power source, such as a battery pack 44 or the like may be contained. Further, the self contained power source may be in the form of rechargeable battery pack 47 resulting in the provision of a recharge connector port as at 48. Alternately, port 48 may be structured to receive a conductor and transformer assembly 49 of FIG. 7E so as to provide power from a conventional source of electricity, wherein a battery pack 44 or 47 is not used or when the battery pack 47 is being concurrently recharged.

Figure 3:
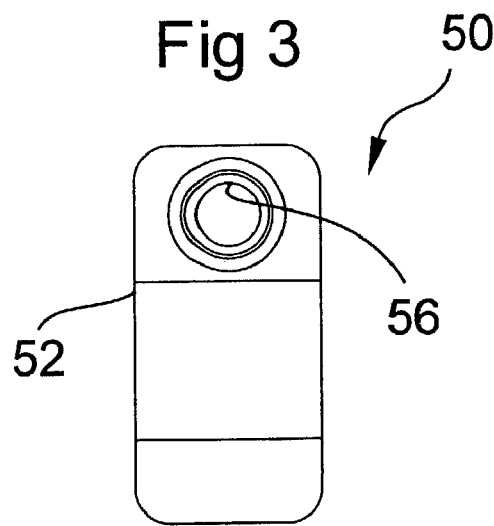
FIG. 3 is a front view of an attachment device wherein the telephone assembly of the embodiment of FIGS. 1 and 2 can be mounted on the person of a user.
Figure 3A:
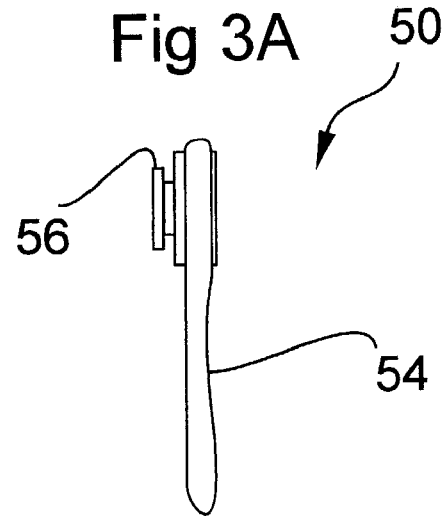
FIG. 3A is a side view of an operative component associated with the attachment assembly of FIG. 3.
Figure 4:
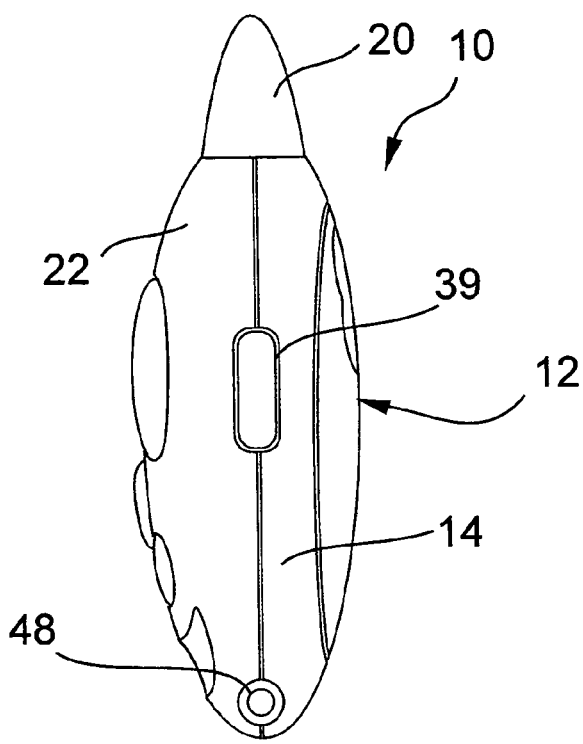
FIG. 4 is a side view of the embodiment of FIGS. 1 and 2.

Also an attachment assembly is generally indicated as 50 in FIGS. 3 and 3A and includes a base portion 52 and a removably attached clip member 54 having a mounting stud 56 dimensioned and configured to be received in recess or chamber 58, associated with structure 60 formed on the rear surface of the casing 14 of the telephone assembly 12.

Figure 5:
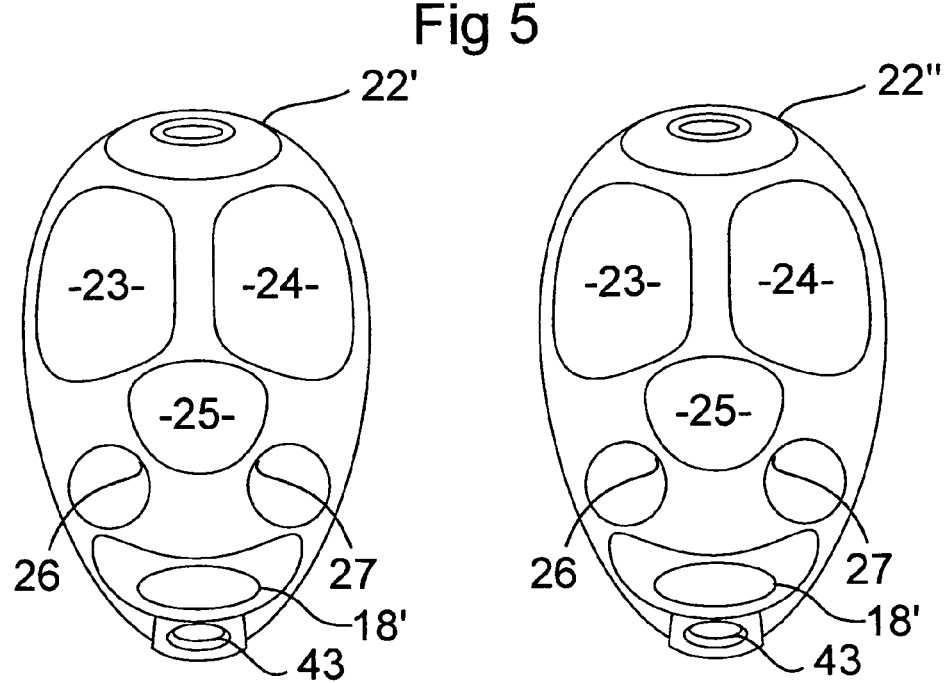
FIG. 5 is a collective array of a plurality of cover plates each of which may be individually mounted on and removed from the embodiment of FIGS. 1 and 2.

Other structural features of the preferred embodiments of FIGS. 1 through 7 are further demonstrated in the collective array of FIG. 5. More specifically, the cover plate 22 may be one of a plurality of cover plates 22', 221", etc. and 22111 each of which may be individually mounted on the casing 14 when it is desired or intended to at least partially alter the overall appearance of the predetermined visual display and/or the facial characteristics, including a clown face, which the visual display may define.

FIG. 6 is structurally similar to the embodiment of FIGS. 1 through 5 incorporating a communication assembly 10 in the form of a cellular telephone 12 having a casing 14 and a plurality of dialing buttons 33 through 37 collectively arranged in a facial presentation. In addition, the embodiment of FIG. 6 includes an illuminated antenna structure 20 which may illuminate in a flashing mode if and when the telephone assembly 12 receives an incoming call from and "unknown" caller, such as when an incoming call originates from the telephone number not previously registered or stored in the memory facilities of the telephone assembly 12. As set forth above, the dialing buttons 33 through 37 are representative of known entities and as such at least partially define the limited access capabilities of the telephone assembly 12. However, in the embodiment of FIG. 6 the telephone assembly 12 may be structured to receive calls from other locations or entities which are not registered and not "represented" by the dialing buttons 33 through 37. In such a situation the flashing illumination of the antenna assembly 20 defines a caller identification capability and serves to inform the user of the telephone assembly 12 that the incoming call is from an unknown source. This feature may be used with or without a an audible ring tone.

Figure 7:
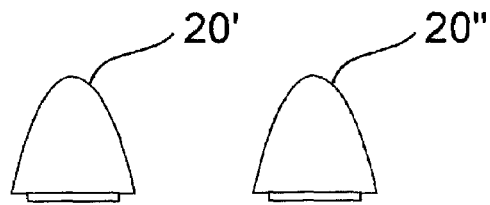
FIG. 7 is a composite view of a plurality of accessories which may be used with one or more of the preferred embodiments of FIGS. 1 through 6.
Figure 7A:
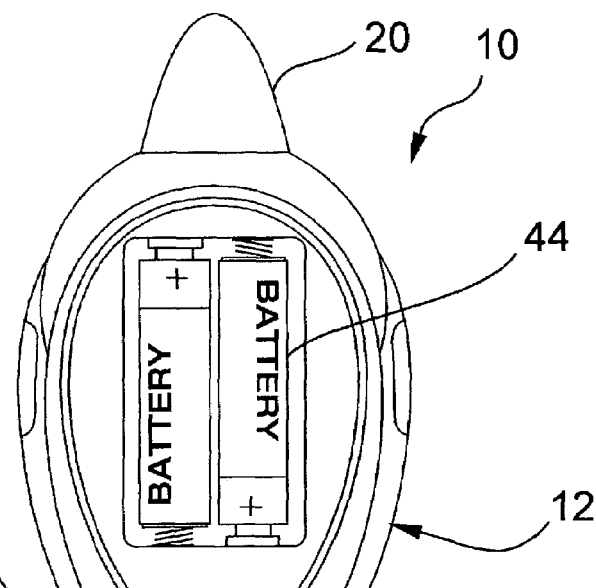
FIG. 7A is a rear view of a communication assembly showing interior portions thereof structured for the storage of a power supply.
Figure 7B:
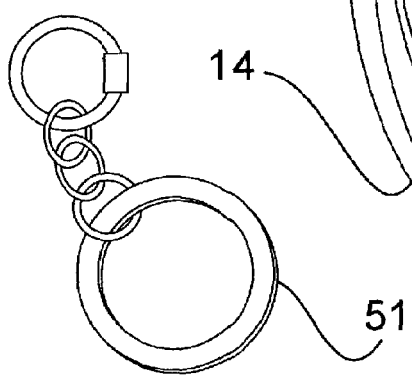
FIG. 7B is a perspective view of a key ring type of accessory to which the embodiment of FIG. 7A, as well as other preferred embodiments may be connected.
Figure 7C:
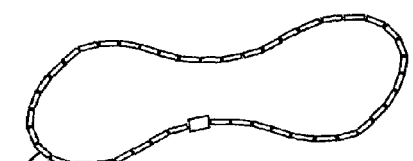
FIG. 7C is a perspective view of another accessory similar in function to that of the embodiment of FIG. 7B.
Figure 7E:
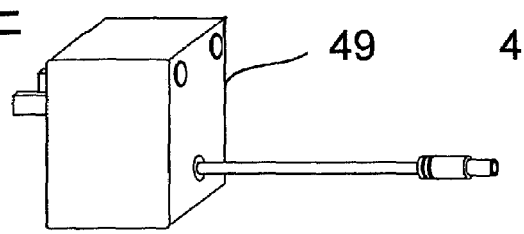
FIG. 7E is a perspective view of a power adaptor assembly used to power the embodiment of FIG. 7A and/or recharge the battery pack as shown in FIG. 7D from a conventional source of electricity.
Figure 7D:
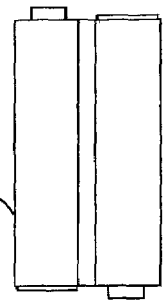
FIG. 7D is a front view of an additional power source in the form of a rechargeable battery pack usable with the embodiment of FIG. 7A.

FIGS. 7 and 7A through 7D disclose the preferred embodiment of FIGS. 1 through 6 with the additional provision of a plurality of accessories which may be mounted on and/or otherwise associated with the communication assembly 10 comprising the telephone assembly 12. With reference to FIG. 7, a plurality of alternately colored antenna structures 20', 20", etc. may be used instead of or in replacement for the antenna structure 20 of the embodiments of FIGS. 6 and 7A. In addition, the telephone assembly 12 may be connected to the person, clothing or other appropriate and convenient objects by means of key ring type of connecting assembly 51 designed to be secured to the connecting aperture 43. Similarly, FIG. 7C discloses a connecting structure or assembly in the form of a continuous, separable chain type device 45 also intended to be secured to the casing 14 through the connecting aperture or hole 43. As set forth above, the telephone assembly 12 may be self powered and include that the replaceable battery pack or assembly 44 the rechargeable battery pack 47 or the transformer assembly 49.

Figure 8:
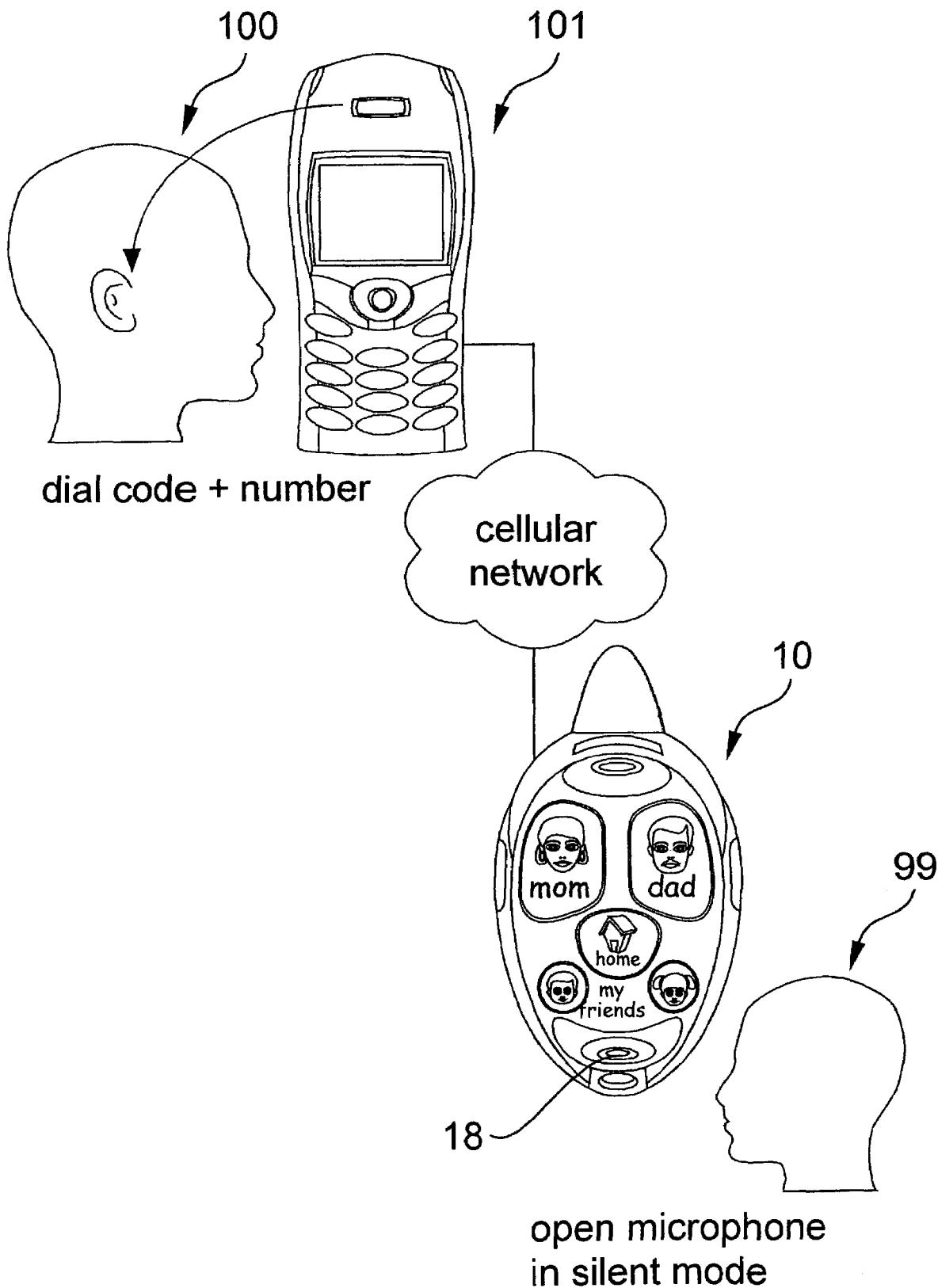
FIG. 8 is a composite view of yet another preferred embodiment of the communication assembly of the present invention in at least partial schematic form.

FIG. 8 is directed to yet another preferred embodiment of the present invention incorporating a "SpyMic" function provided for purposes monitoring children, teen-agers or other individuals 99 using the telephone assembly 12 of the present invention. As such, a parent or other authorized personnel 100, using a standard telephone and/or cellular telephone assembly 101, will enter a predetermined code number or "dial code". This will be immediately followed by the telephone number assigned to the telephone assembly 12 of user 99. The result will be the establishment of a communication link, over conventional cellular networks or other telephone communication facilities, with the telephone assembly 12 but only to the extent of opening the microphone 18. The parent or other authorized personnel 100 will thereby be able to monitor the environment of the user 99 by the voices, sounds, etc. being received by the microphone 18. The remainder of the functional capabilities of the telephone assembly 101 will be in a "silent mode", such as no ringing, so that the user 99 is not aware of the monitoring procedure.

Further with regard to the preferred embodiments of FIGS. 1 through 8, the telephone assembly 12 includes programming capabilities which may be adaptable to the phone assembly 12 when use as a "kid phone" and the "group specific" individuals are children, teenagers or otherwise younger individuals of an age that are still required to respond to parental control or authority. As related to the programming capabilities and function, a parent or other authorized individual can pre-program the phone assembly 12 such that only the aforementioned, pre-selected calling numbers may be reached by the user of the phone assembly 12. Somewhat similarly, and as also set forth above, only a certain number of incoming calls may be accepted by the telephone assembly 12 such as those indicated by the appropriately designated control buttons 33, 34, 35 and 40 respectively designating the entities of "mom", "dad", "home" and "friends".

An example of the programming process comprises a telephone number (305-466-4400) being entered for the "mom" entity by pressing the "mom" control button 33 for a predetermined period of time such as 3 seconds. Thereafter, each numeral of the correct "mom" telephone number would be successively entered by pressing the "mom" button 33 a consecutive number of times equal to the quantity of each numeral. By way of example, the numeral 3 would be entered by pressing the mom button 33, three times. Immediately thereafter the "home" button 35 would be pressed a single time in order to clear the programming facilities for the entry of the next numeral, such as zero. The mom button 33 would then be pressed 10 consecutive times (10 being equal to 0), after which the home button would be pressed a single time. Each of the numerals in the telephone number to be entered (305-466-4400) would follow the sequence. After the entire number had been entered, the mom button 33 would-be depressed and held for approximately 3 seconds or other predetermined length of time to secure entry of the predetermined telephone number. To validate entry, the calling of the telephone assembly 12 would be accomplished from a different telephone using the telephone number just entered.

Each different telephone number representative of a different entity such, "dad", "home", "friends" would be entered in this manner. Once the entire set of numbers have been programmed into the telephone assembly 12 anti-theft and/or program protection facilities incorporated within the appropriate circuitry of the telephone assembly 12 could be activated. More specifically anti-theft protection is possible by establishing a predetermined code number (3349). As a result the telephone assembly 12 could not be used and/or reprogrammed without knowledge and input of the predetermined anti-theft protection code (3349). Accordingly, when used by an authorized person, the anti theft protection code (3349) would first be entered in a predetermined sequence. By way of example, the "mom" and/or the "dad" buttons 33 and 34 respectively would be depressed for a predetermined period of time, such as 3 seconds. Thereafter the protection code (3349) would be entered in the manner set forth above as described with reference to entering the predetermined telephone numbers. This will serve to "unlock" the telephone assembly 12 for authorized access. Each time the telephone assembly 12 was not in-use, such as by being turned off or by being inactive for prolonged periods, the anti-theft feature would be automatically instigated and thereby require the re-entry of the protection code (3349) to again use the telephone assembly 12.

As will be apparent in the detailed description of the additional preferred embodiments of the present invention the same anti-theft protection code, as well as the implementation thereof, could be included for use with the telephone or communication assemblies representative of the additional preferred embodiments.

Figure 9:
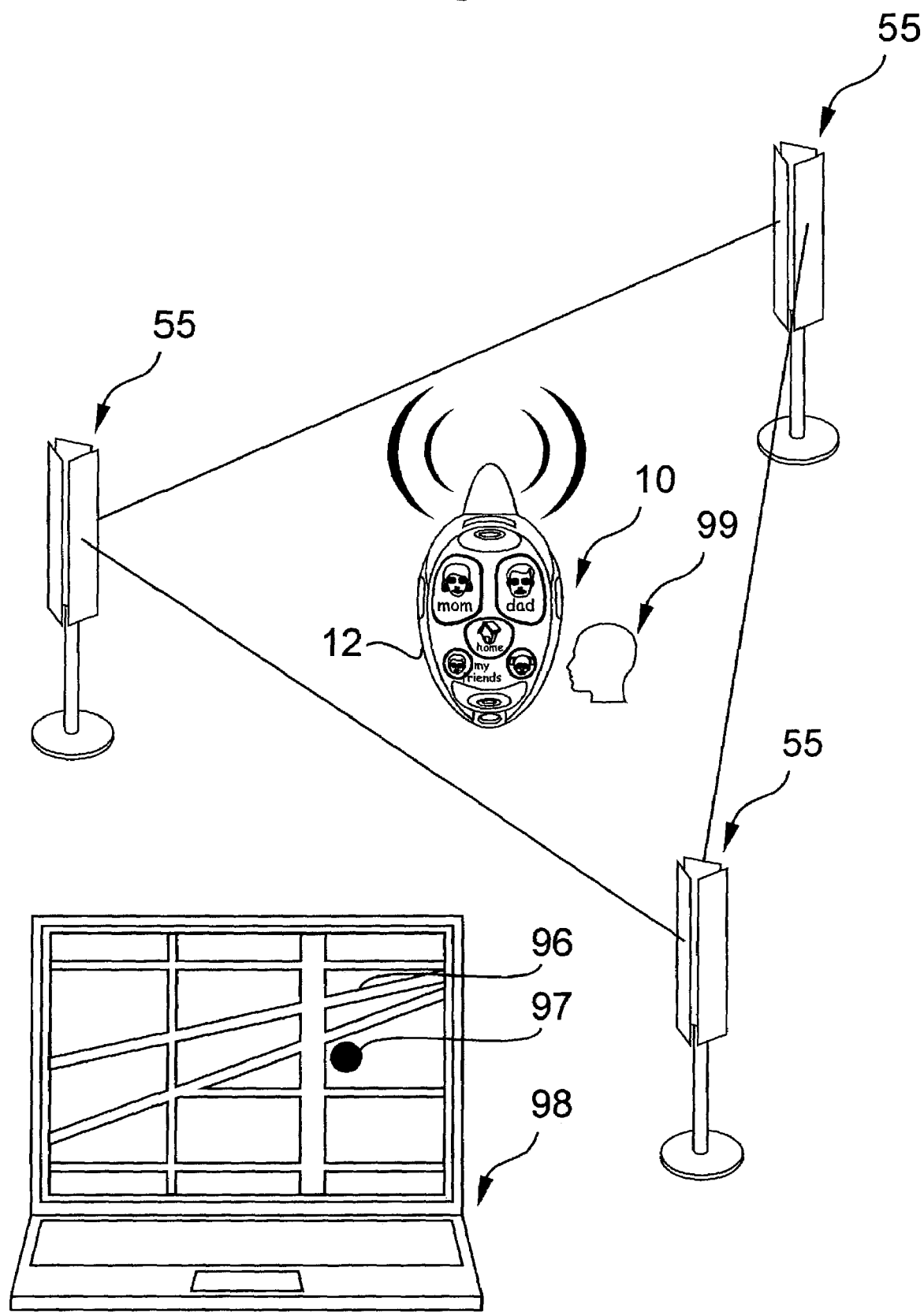
FIG. 9 is a composite view in at least partially schematic form of yet another preferred embodiment of the communication assembly of the present invention including geographic location features.

FIG. 9 is directed to another preferred embodiment of the present invention wherein the communication assembly 10 is in the form of a cellular telephone assembly 12 and includes geographic location capabilities. More specifically, the telephone assembly 12 can be operatively associated with a carrier network or service schematically represented by a plurality of antennas 55 collectively defining the geographical area to be monitored. Further, the telephone assembly 12, when activated either by the child user 99 or remotely therefrom such as by input directed from the computer 98 will begin to generate homing signals. If the user 99 and/or telephone assembly 12 is within the monitored area, determined by the collective array of antennas 55, the homing signals generated will be capable of being received by the computer assembly 98 or receiving facilities associated therewith. Incorporated within the operative systems, including the carrier system defined at least in part by the collective antenna array 55, is the provision of wireless application protocol to assure a reliable communication link between the telephone assembly 12 and the computer 98.

Figure 10:
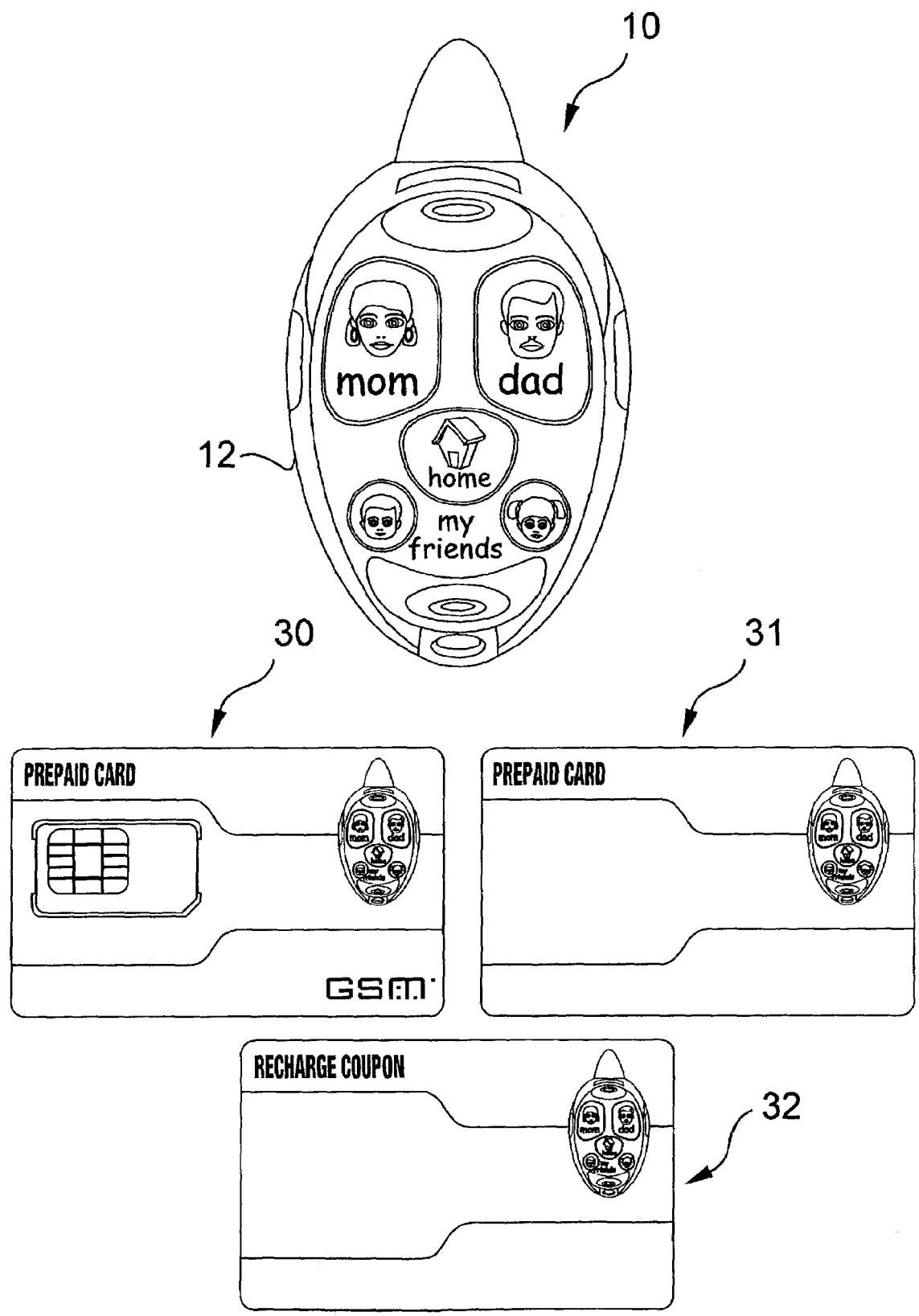
FIG. 10 is a composite view of yet another preferred embodiment of the communication assembly of the present invention directed to the use of a cell phone with a plurality of prepaid calling cards of various types.

With reference to FIG. 10, the composite display discloses the use, especially by minors, of the telephone assembly 12 of the communication assembly 10 by means of anyone of a plurality of commercially available calling cards 30, 31, 32, etc. As is known, any of the prepaid calling cards 30 through 32 can be "replenished" so as to provide additional calling time. However, in this embodiment a parent, caretaker or other person in authority can control the cost associated with using the telephone assembly 12 by individuals, particularly children, which may have a tendency to ignore the accumulation of excessive calling charges.

Figure 11:
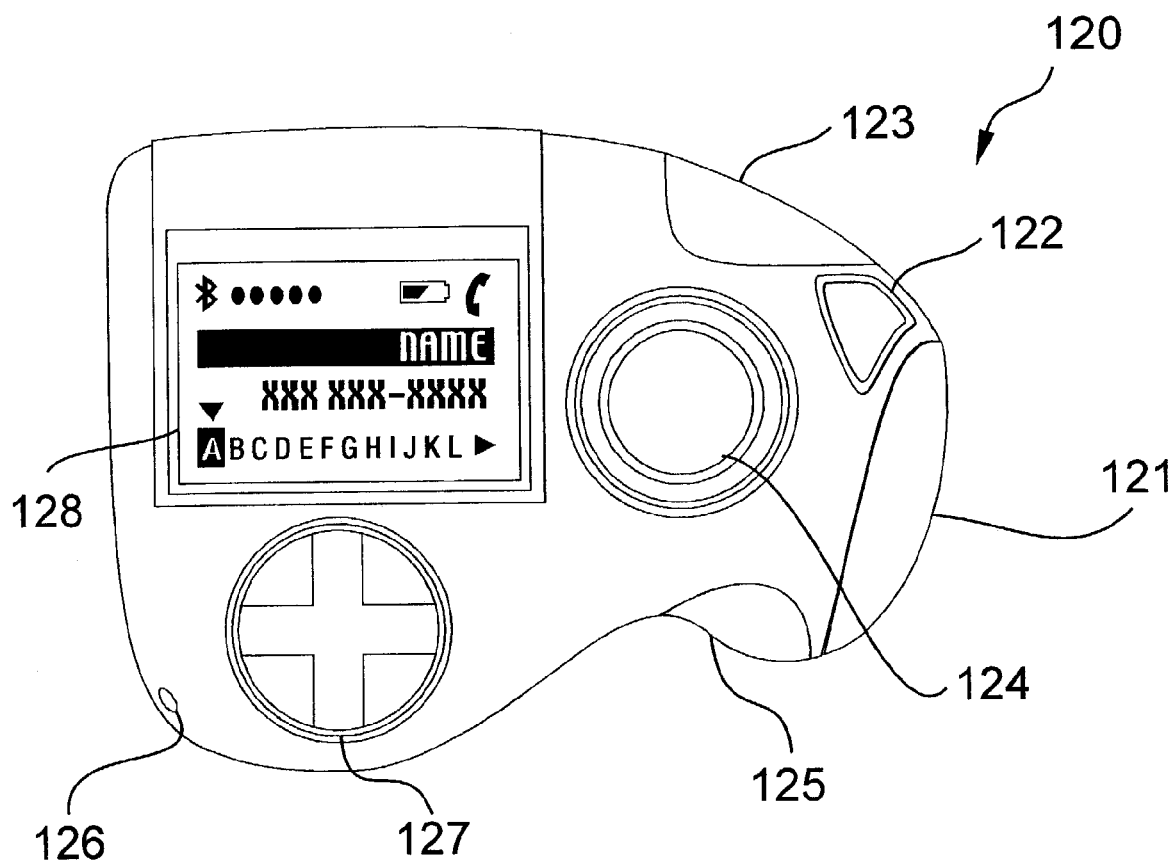
FIG. 11 is a front view of yet another preferred embodiment of the communication assembly of the present invention including a visual display assembly which facilitates the playing of games through the operation of the various components of the communication device.
Figure 12:
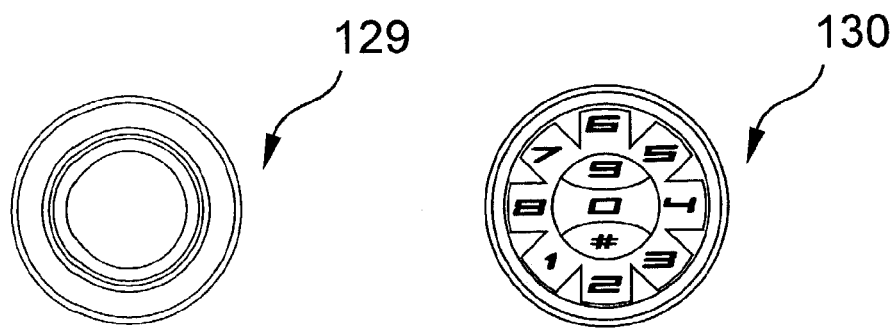
FIG. 12 is a composite view of a plurality of operative components that can be used to replace the various components of the embodiment of FIG. 11.

FIGS. 11 and 12 are representative of yet another preferred embodiment of the present invention. The communication assembly 120 of the present invention is in the form of a cellular telephone specifically structured to incorporate game playing capabilities and functions in addition to serving as a telephone. More specifically, the cellular telephone 120 includes a speaker structure 122, an antenna assembly 123 and a microphone 126. The cellular telephone 120, as with other preferred embodiments of the communication assembly of the present invention may be powered by a self contained power source such as a replaceable and/or rechargeable battery pack stored within compartment 121. One or more control and/or function buttons 124 and 127 may be operatively associated with the processing assembly on the interior of the cell phone 120 and serve to control the function or mode of operation as with button 24 and/or serve to control the specific functions or modes chosen such as by a directional scrolling button or modified "joy stick". Other structural and operative features associated with the communication assembly/cell phone 120 includes a display assembly 128 preferably in the form of a liquid crystal display (LCD) screen and a hold, pause and/or lock out button or component 125.

The versatility of the embodiment of FIG. 11 is further demonstrated by the ability to alter the functional and/or operational capabilities of the cell phone assembly 120 through the substitution of a multi-directional joy stick member 129 which may be substituted for the control member 127. In addition, the modified key pad assembly 130 may be substituted for the function button 124. As such, the key pad 130 may include alpha-numeric indicia thereon so as to facilitate dialing a number being called or the performance of other functions more specifically associated with the game playing capabilities, as set forth above.

Figure 13:
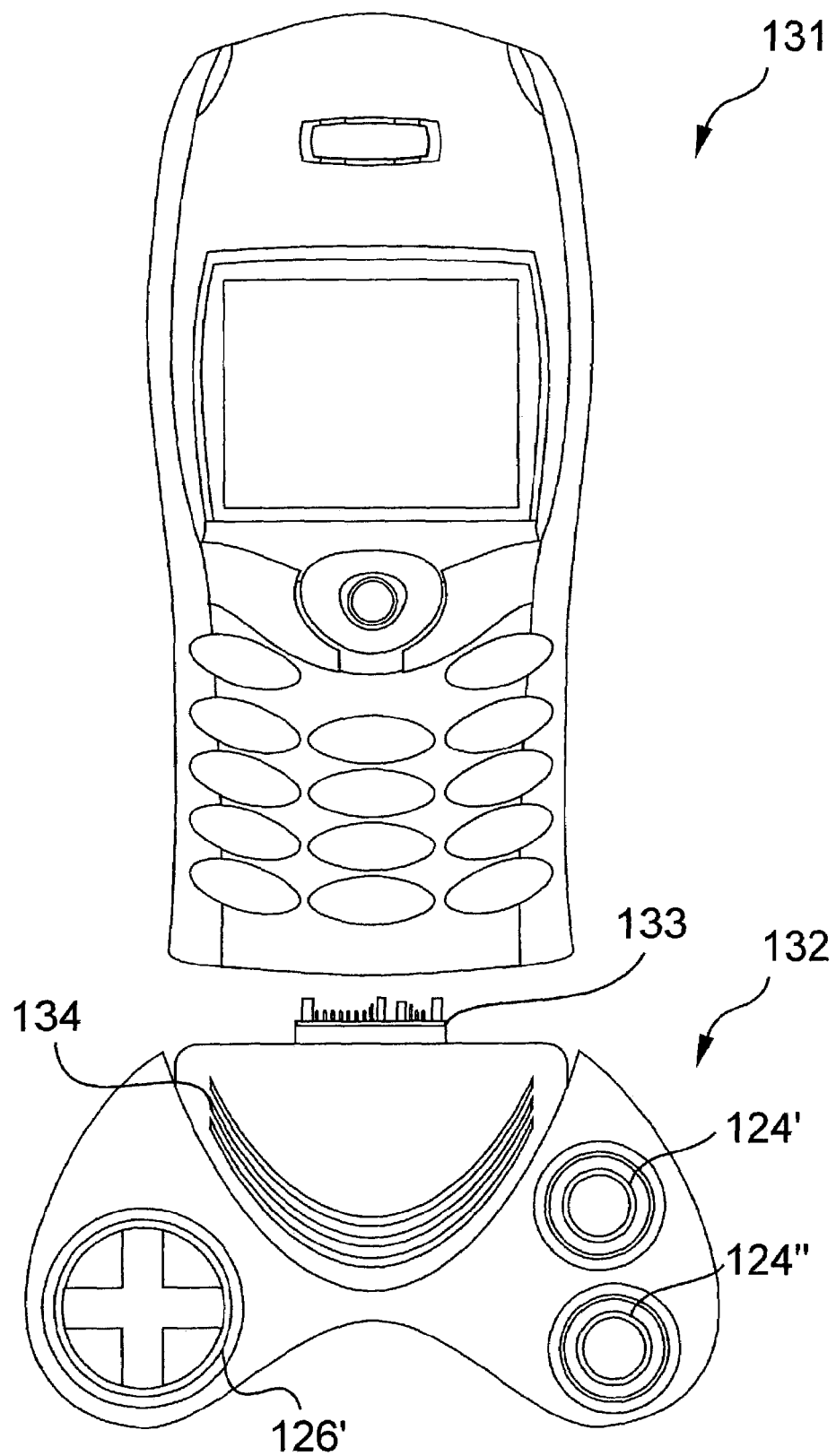
FIG. 13 is a composite view of a communication assembly functional in cooperation with a game pad, plug-in assembly for the playing of games, functionally similar but structurally distinguishable from the embodiment of FIGS. 11 and 12.

The versatility of the communication assembly of the present invention is further demonstrated in the embodiment disclosed in FIG. 13. More specifically, the game pad assembly 132 is structured in the form of a peripheral or add-on device selectively interconnected to the cell phone 131 by an appropriate interface structure 133. The cell phone assembly 131 may be of conventional design or structure 131 having game playing capabilities thereby incorporating wireless application protocol and/or downloading features from more conventional medium. Further, the game pad assembly 132 includes a speaker phone 134 from which sound may be received from the game playing application. Naturally, the speaker phone 134 may be structured to establish voice communication when the cell phone assembly 131 is not operative in its game playing mode but is used as a conventional cell phone communication device. Other features associated with the game pad assembly 132 include one or more function buttons 124' and 124" as well as a directional scrolling button or member 126'. The function and/or control members or buttons 124', 124" and/or 126' are similar in structure and/or function to the function and control members 124, 127, 129 and/or 130 described with reference to the embodiment of FIGS. 11 and 12.

Figure 14:
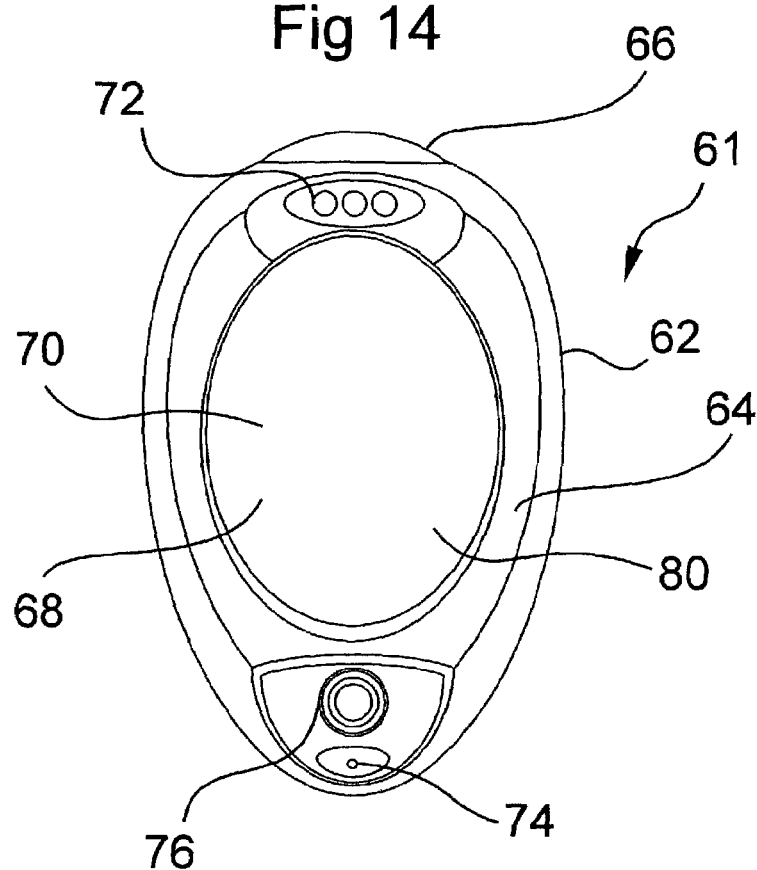
FIG. 14 is yet another preferred embodiment of the communication assembly of the present invention comprising structural variations in the casing and operative components associated therewith.
Figure 15:
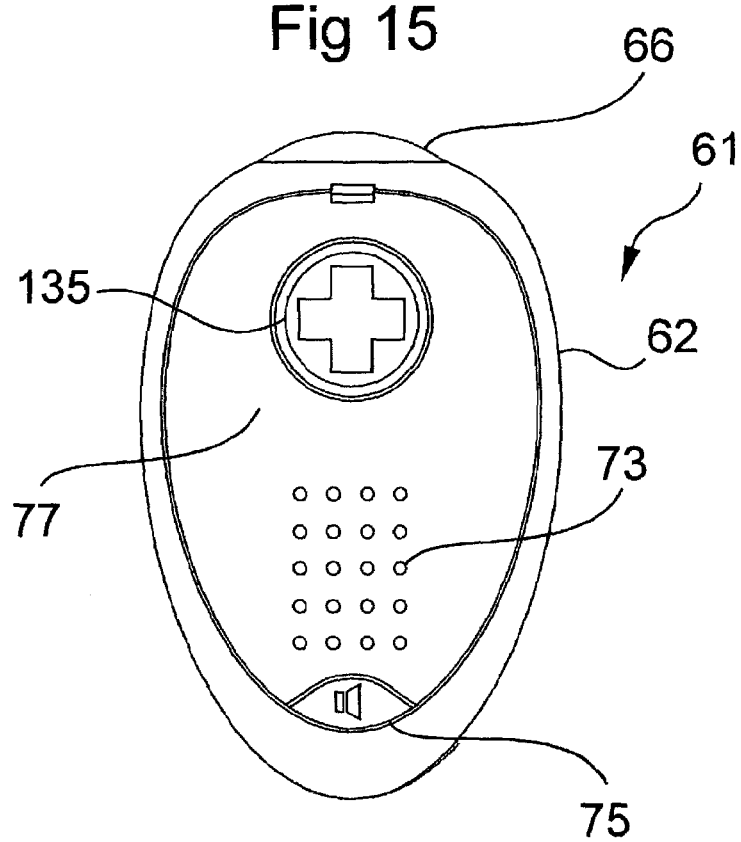
FIG. 15 is a rear view of the embodiment of FIG. 14.

The embodiment of FIGS. 14 and 15 demonstrate a communication assembly in the form of a cellular telephone 61 including a casing 62 representative of an easy to use phone model or "EZFon" structured to appeal to specific groups such as, the elderly, physically challenged, etc. More specifically, the casing 62 incorporates an exposed outer cover plate 64 and related operative and functional components including an antenna 66. In addition, this preferred embodiment comprises a control assembly including at least one control member 68 as well as the functional or directional scrolling or browsing button 76. The cover plate 64 includes at least one window 70 cooperatively structured and disposed with the one control member 68 so as to facilitate both visual and physical access thereto. Operational features of this embodiment includes a speaker 72 and a microphone 74 appropriately located on the casing 62. As set forth above, this easy phone embodiment includes appropriate communication circuitry, processor, memory, etc. maintained within the interior of the casing 62 and operatively accessible by manipulation of the phone member 68 and/or function/control member of button 76.

With regard to FIG. 15, a speaker phone is incorporated within the cell phone assembly 61 and is operative into an on/off mode by manipulation of a speaker phone control member or button 75. The speaker phone sound generating assembly may be housed within an interior compartment adjacent or common to a battery compartment as at 77. Also disclosed in FIG. 15 is an emergency or quick access control member or button 135. Depression or other activation of button 135 causes quick and "auto-dial" contact with anyone or more emergency facilities or services, such as an ambulance, hospital, police, etc.

As with other preferred embodiments of the present invention, numerous ones of the communication assemblies in the form of a cellular telephone assembly include microprocessing facilities and memory or data storage capabilities capable of processing generally between 20 and 100 telephone numbers. Each of these numbers may be pre-programmed into the memory or storage facilities of the respective embodiments of the cellular telephone assemblies. These telephone numbers are individually accessible through manipulation of both the function control member or button 76 and/or the single control member or dialing button 68 as demonstrated in the embodiment of FIGS. 14 and 15. As also set forth herein scrolling capabilities through manipulation of the control/function button 76 are also incorporated into the telephone assemblies 61 as well as other preferred embodiments described in detail herein.

Figure 16:
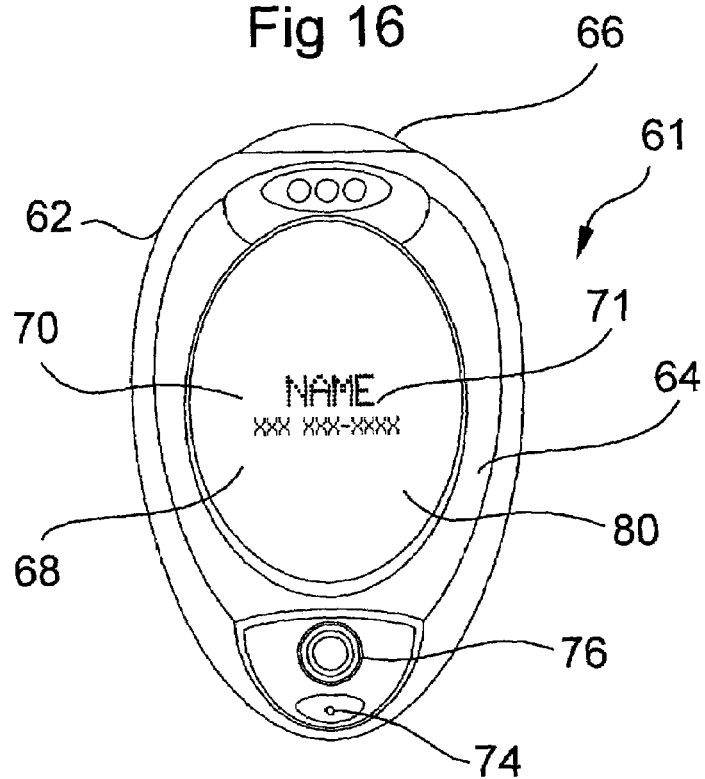
FIG. 16 is a front plan view of a communication assembly similar to the embodiments of FIGS. 14 and 15 incorporating a face plate on an exposed face thereof.
Figures 17, 17A:
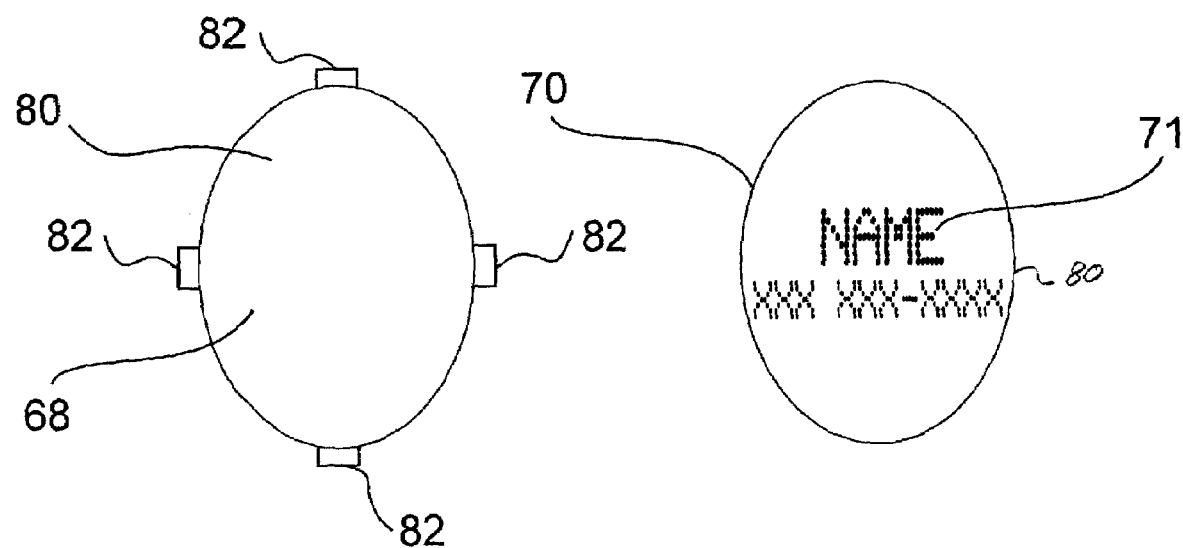
FIGS. 17 and 17A are front views of a display screen magnifier structures that may be used with the embodiment of FIG. 16 as well as other embodiments of the present invention.

Additional structural features associated with the communication assembly of the present invention are demonstrated in the embodiments of FIGS. 16, 17 and 17A. The telephone assembly 61 comprises a casing 62 including the control member or dialing button 68 being structured in the form of a display assembly such as, but not limited to, an LCD 70. As such, appropriate informational indicia 71 which may take the form of a name, pictorial display, icon, etc. of the calling party or party being called can be visually accessible thereon. In order to enhance the ability of certain individuals, such as those who are visually challenged, the casing 62 may also include a cover member such as a lens or display screen magnifier structure, generally indicated as 80. The magnifier structure 80 includes a plurality of peripherally disposed connector members 82 which are collectively oriented and structured to facilitate removable attachment of the magnifier structure 80 in overlying relation to the display screen 70 which defines or serves as part of the control member 68, as set forth above. When the magnifier structure 80 is appropriately disposed in its operative position, certain visually challenged individuals may better enjoy an enlarged appearance of the indicia 71 as demonstrated in FIG. 17A.

Figure 18:
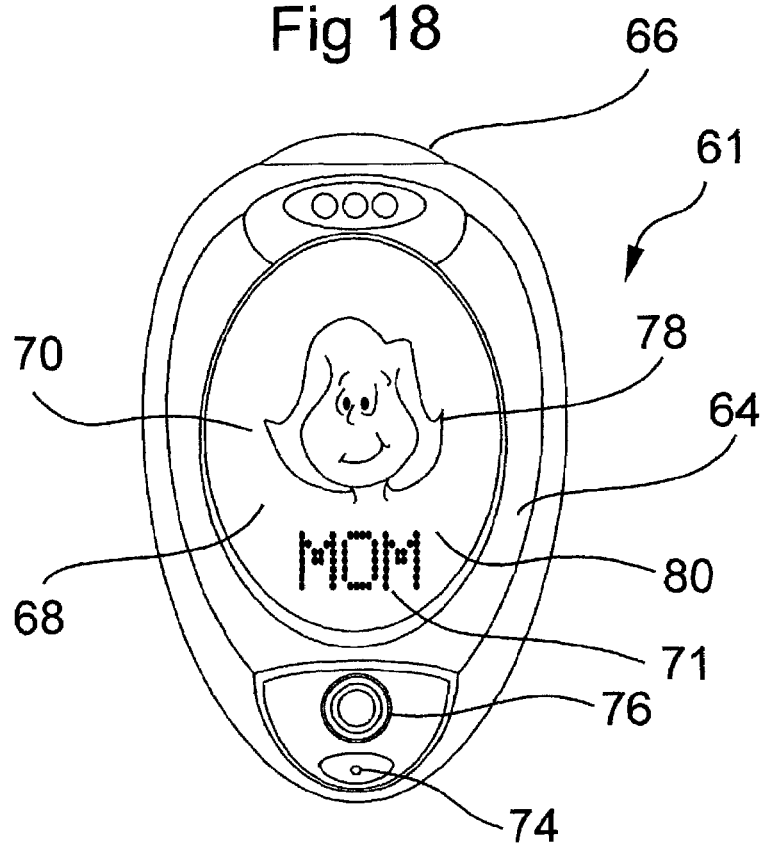
FIG. 18 is a front plan view of a variation of the embodiment of FIGS. 16 and 17.
Figure 18A:
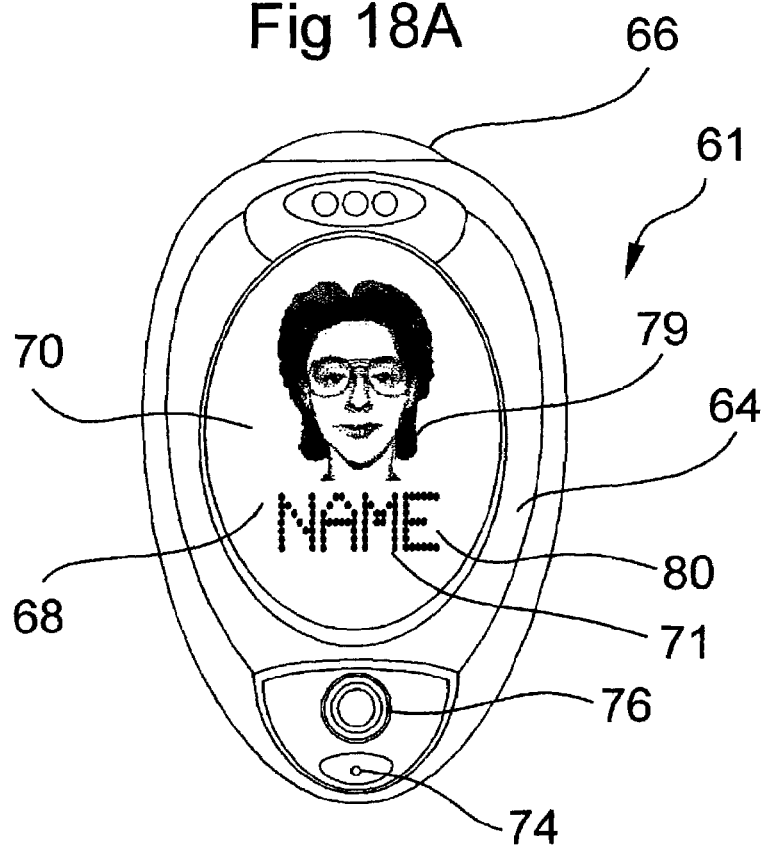
FIG. 18A is a front plan view of another variation of the embodiments of FIGS. 16 through 18.
Figure 19:
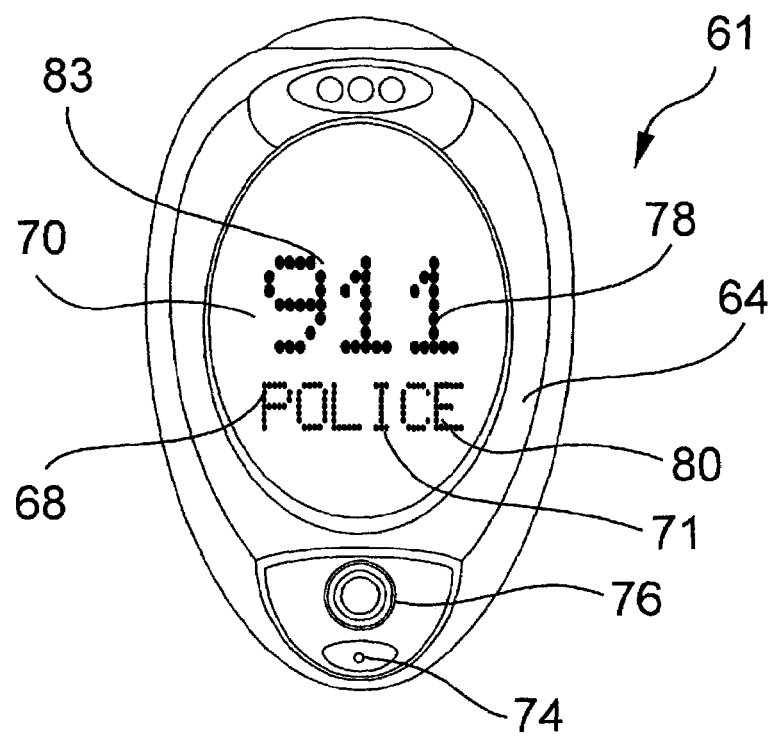
FIG. 19 is a front plan view of a variation of the embodiments of FIGS. 16 through 18.
Figure 20:
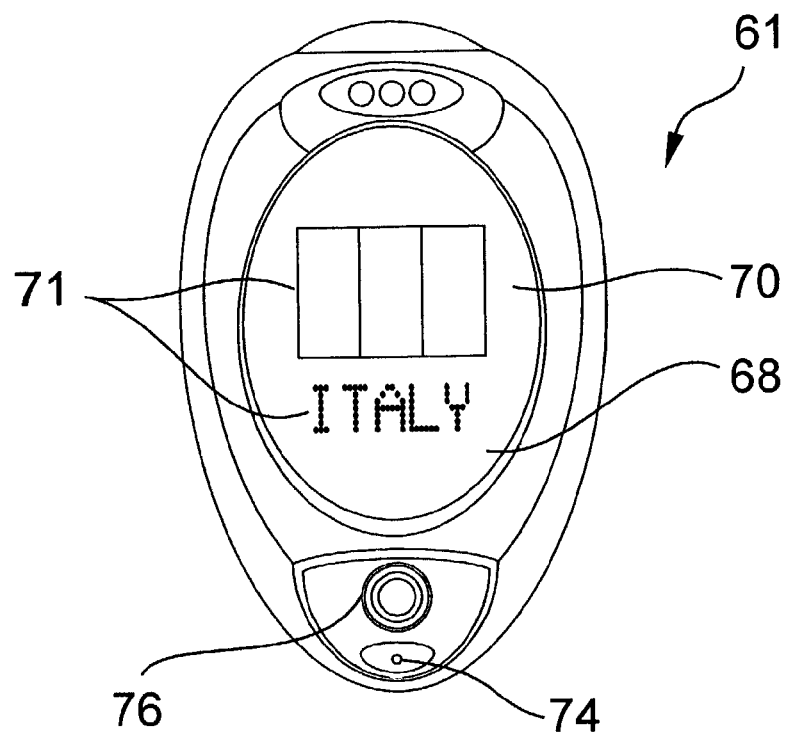
FIG. 20 is a front plan view of yet another variation of the embodiments of FIGS. 16 through 19.
Figure 21:
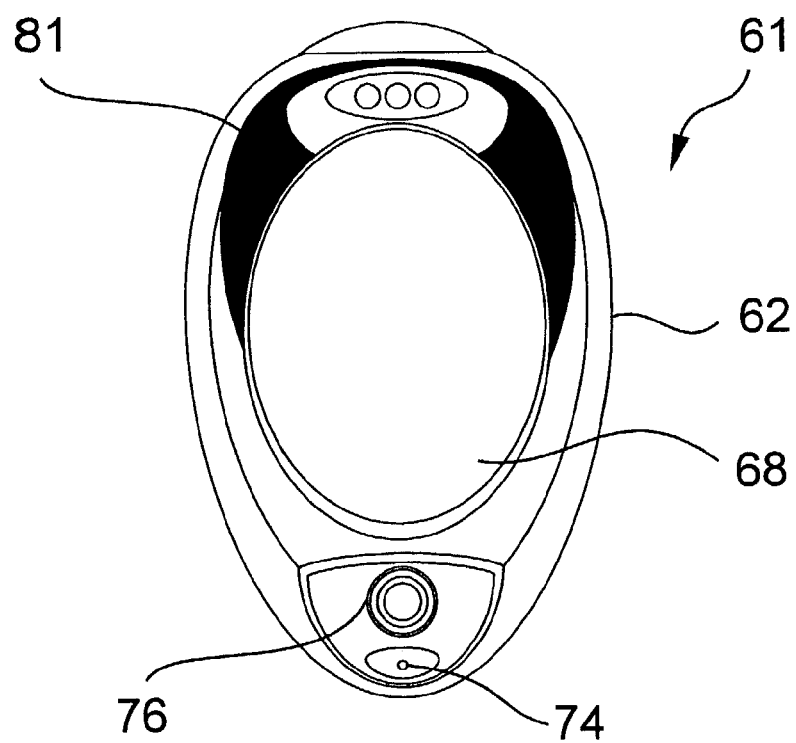
FIG. 21 is a front plan view of yet another preferred embodiment of the present invention incorporating a radiation shield for the protection of user of the communication assembly of the present invention.

The additional preferred embodiments of FIGS. 18 through 20 are similar in both structure and function to that of the embodiment of FIGS. 16 and 17. The identifying indicia displayed on the LCD display assembly 70 may take a variety of forms, as previously described with the other preferred embodiments of the present invention. Moreover, such displayed identifying or informational indicia may comprise alpha-numeric displays as shown in FIG. 16, depicted icons or drawings as shown in FIG. 18 and/or pictorial displays as shown in FIG. 18A, the latter of which represents more realistic identifying features of the various entities associated with each of the preprogrammed, pre-set telephone numbers.

It is also emphasized that the operational capabilities of many of the preferred embodiments of the communication assembly of the present invention, including the various embodiments of the telephone assembly 61, include accessing and/or scrolling capabilities. Moreover, large quantities of telephone numbers may be pre-programmed into the memory facilities of the telephone assembly 61 and may be readily accessed by predetermined manipulation of the control member or button 68 and/or the function button 76. When performing the scrolling feature, access is provided to the various pre-stored telephone numbers which in turn may be visually indicated on the display 70 associated with the dialing or control button 68 not only by the aforementioned alpha-numeric indicia, icon description or pictorial display but also by other symbolic indicia representation.

Figure 19A:
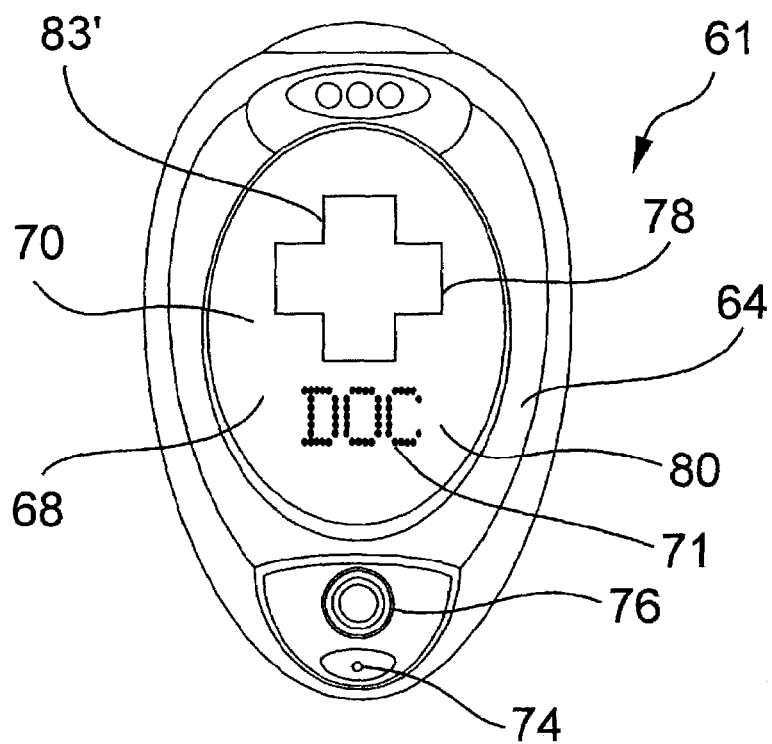
FIG. 19A is a front plan view of a variation of the embodiments of FIGS. 16 through 19.

As shown in FIGS. 19, 19A and 20, the visually presented indicia 78 and/or 79 may also be in the form of representative icons indicative of a doctor, nurse, hospital, ambulance, fire department, police, emergency medicare, in addition to individuals as shown in FIGS. 18 and 18A. Further pictorial displays as shown in FIG. 20 may be representative by a country or other geographical location, such as when the cellular telephone assembly 61 includes a dedicated communication link therewith. Naturally, as in other preferred embodiments of the present invention, manipulation of the control member 68 prior or subsequent to scrolling to visually display the proper icon for telephone communication therewith may include speed dial or touch dial and fast find of various pre-programmed applications associated therewith.

Yet additional structural modifications and functional advantages associated with the communication assembly, preferably in the form of cellular telephone assembly 61 include the provision of an internally mounted radiation assembly 81 integrated within the casing 62 and disposed dimensioned and configured to provide appropriate shielding capabilities to the user.

Figure 22:
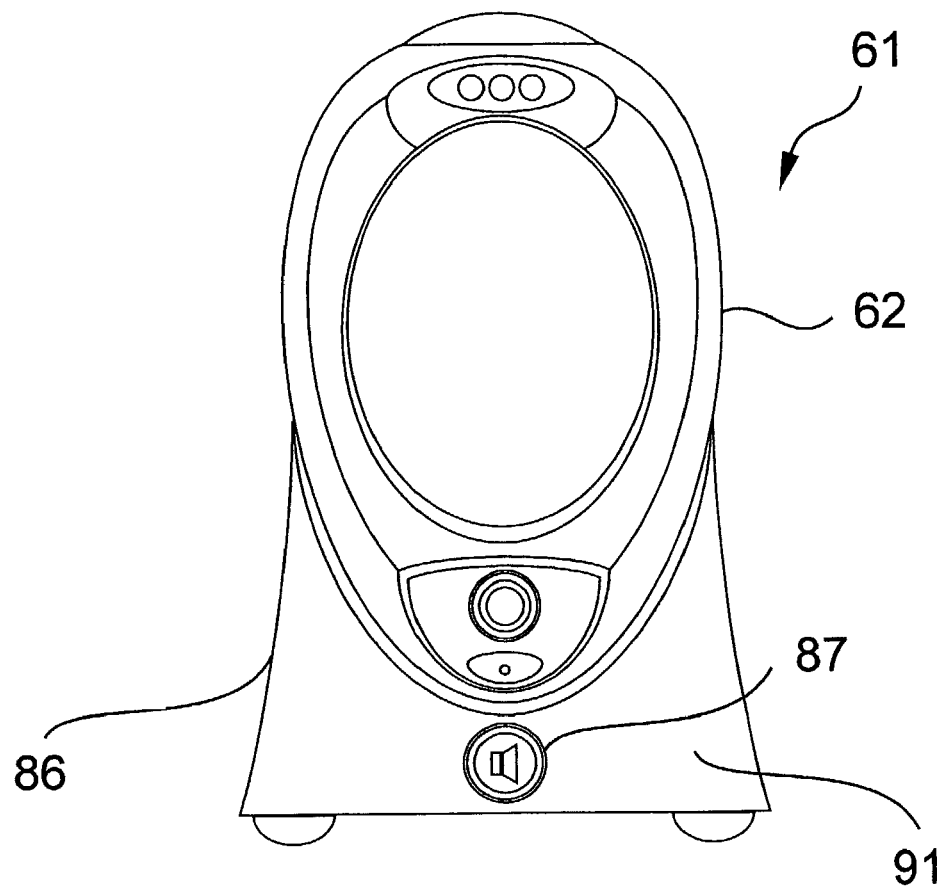
FIG. 22 is a front plan view of yet another preferred embodiment of the present invention incorporating a support assembly which may also be structured to serve as a charging device for a self-contained power source within the communication assembly.
Figure 23:
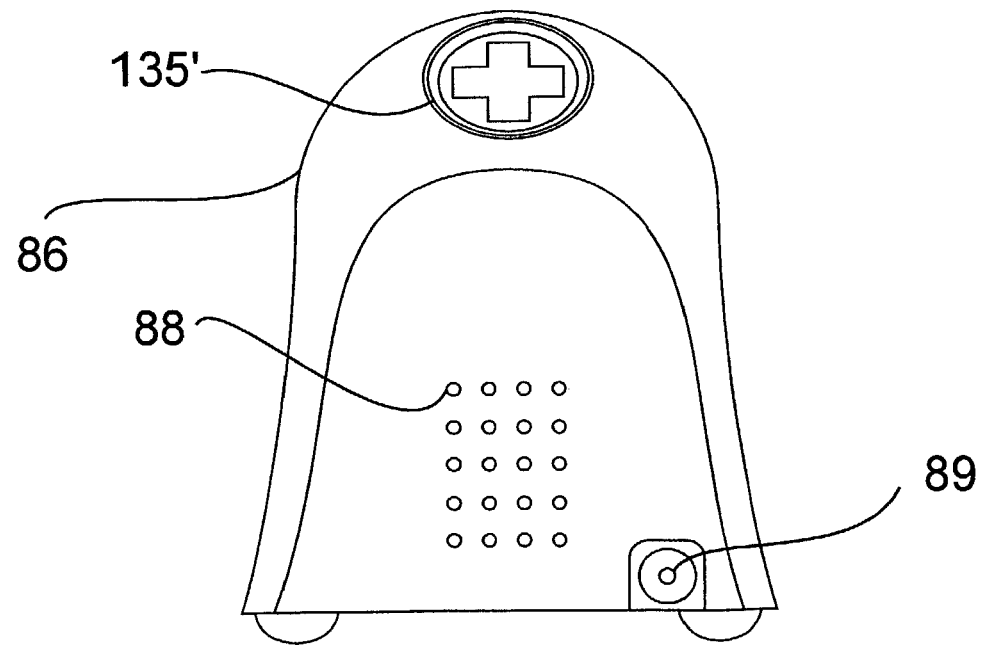
FIG. 23 is a rear view of the support assembly associated with the embodiment of FIG. 22.

With reference to the additional preferred embodiment of FIGS. 22 and 23 the telephone assembly 61 is structured to cooperate with a platform type of support and holder 86 which may be in the form of a cradle type of support and also serve as a charger assembly dimensioned and configured to be desktop oriented. However, the cradle or support 86 may also include a speaker phone assembly 88 operated by an on/off speaker phone button or member 87. As described in detail with regard to the embodiment of FIG. 15, a quick access, and/or emergency service button or control member 135' may also be provided as shown. Other features which may be associated with the embodiment of FIGS. 22 and 23 include a recognizable glow light assembly 91 incorporated directly within the cradle like support and charger 86. Also when used as a charger the access port 89 includes appropriate circuitry and/or a self contained, re-chargeable battery pack maintained within the interior of the casing 62 by means of an appropriate interface. The inlet 89 is disposed and structured to receive a conductor plug on a transformer assembly 49 as described with reference to FIG. 7E.

Figure 24:
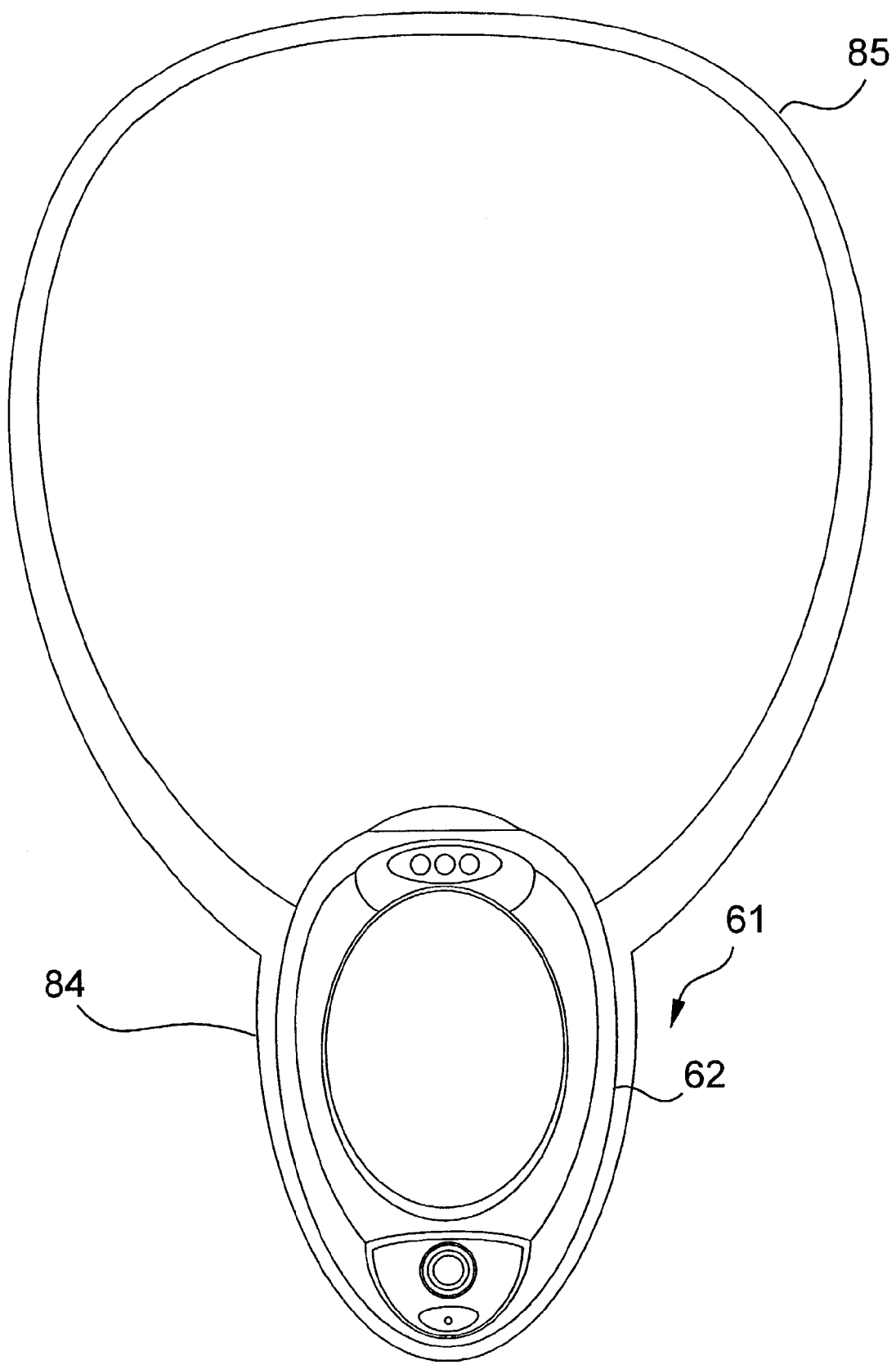
FIG. 24 is a front plan view of yet another preferred embodiment of the present invention wherein a communication assembly is secured to a mounting device intended to fit about the neck and shoulder area of a user for support of the communication assembly on a person's body.
Figure 25:
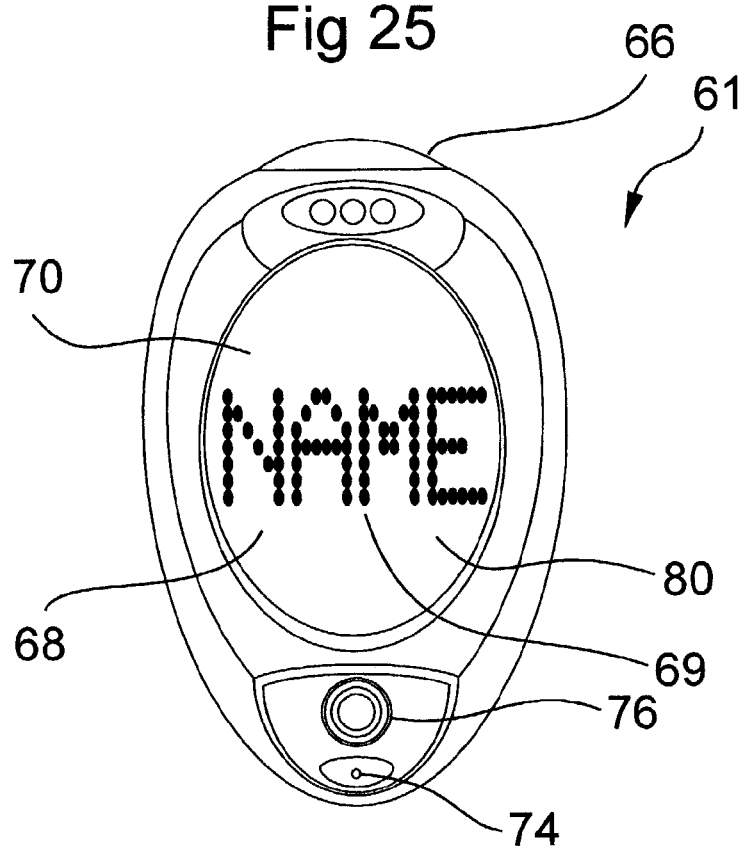
FIGS. 25 and 25A are structural variations of the embodiments of FIGS. 16 through 20 directed to visual display of informative information which is enlarged for visually challenged users.
Figure 25A:
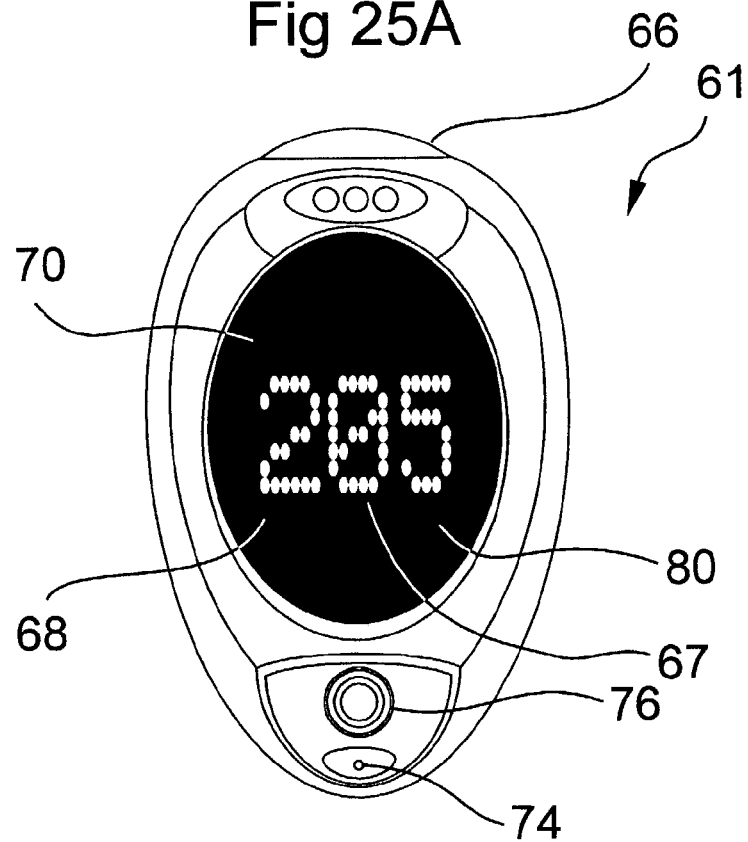
Figure 30:
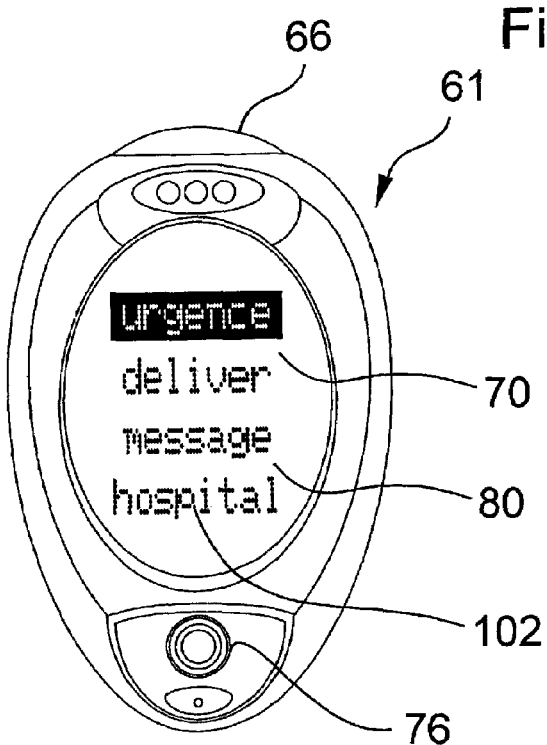
FIGS. 30 and 31 are both plan views of yet another preferred embodiment of the communication assembly of the present invention incorporating messaging capabilities for emergency, medical or like situations.
Figure 34:
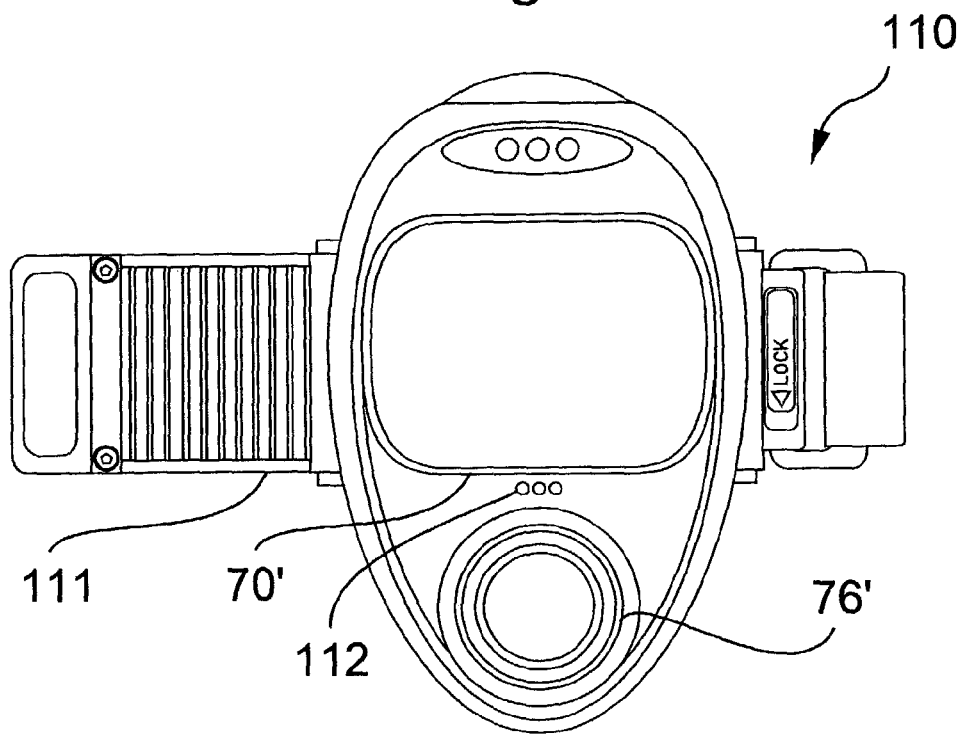
FIG. 34 is a front plan view of yet another preferred embodiment of the communication assembly of the present invention structurally adapted to be mounted about the wrist or other portion of the user's body.
Figure 36:
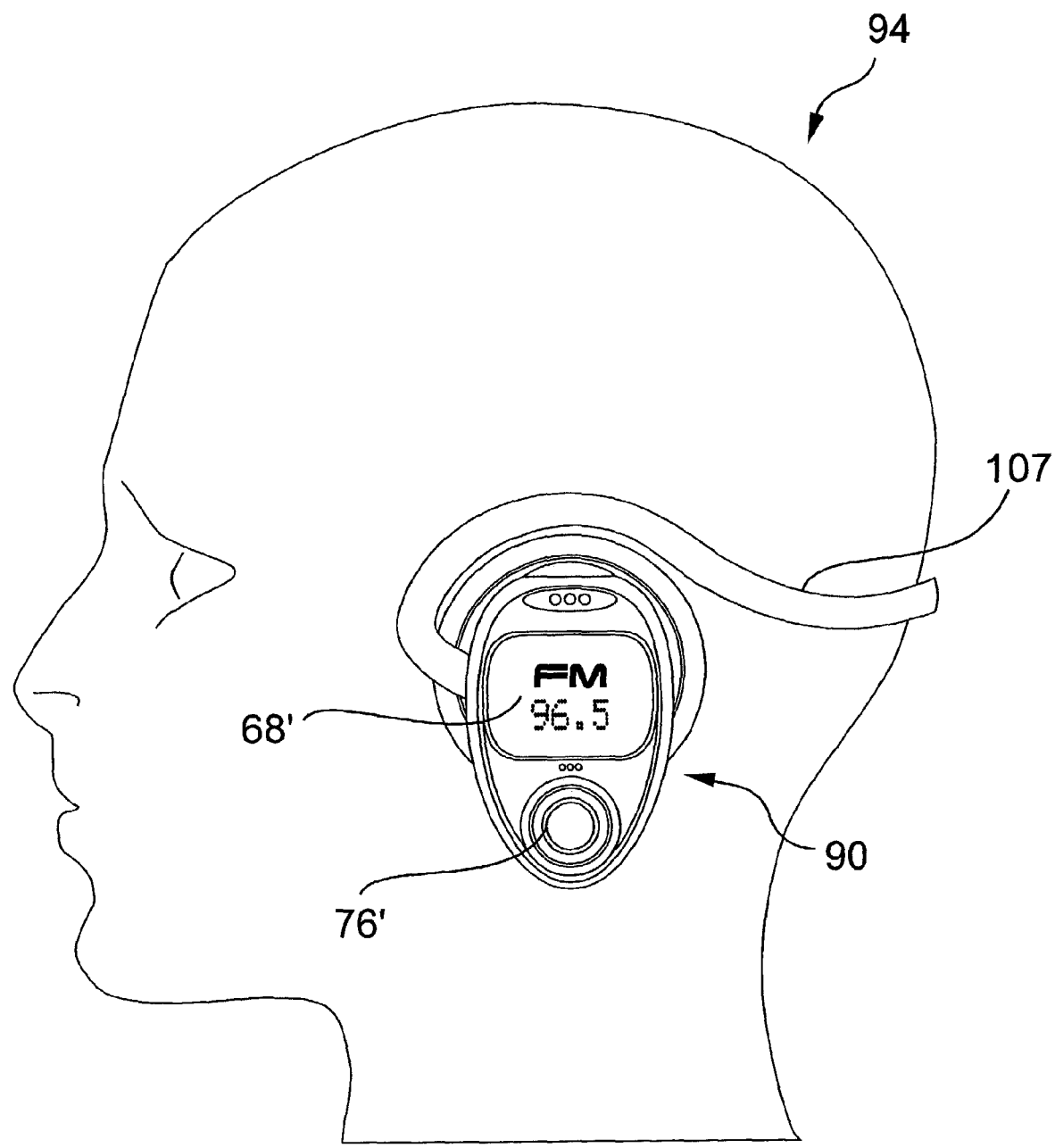
FIG. 36 is yet another preferred of the present invention wherein the communication assembly can incorporate both cellular telephone and radio receiver capabilities.

It is recognized that in some instances it may be more convenient, or even necessary, to carry or support the telephone assembly 61 on a person's body, clothing, etc. rather than holding the telephone assembly 61 in the user's hand while a call is being conducted. Accordingly, the additional preferred embodiments of FIGS. 24, 34, and 36 are directed to mounting or connecting assemblies specifically structured to carry and support a telephone assembly or other component associated with the communication assembly of the present invention in various, convenient or appropriate locations on a person's body. With specific reference to the embodiment of FIG. 24, a necklace type structure 85 comprises an annular or loop-type configuration of sufficient dimension to fit over the head and generally about the neck and/or shoulder area of a wearer. In addition, a cradle, support or carrier device 84 is secured to the necklace 85 and is specifically dimensioned and structured to removably secure the telephone assembly 61 therein. As such, the telephone assembly 61 is positioned relative to the head of the user in an orientation which facilitates communication with the telephone assembly 61 without removing it from the cradle or support 84.

With reference to the embodiment of FIG. 34, the communication assembly of the present invention is embodied in a telephone assembly 10 which is specially, but not exclusively, adapted for use in a sport or athletic environment. As such, the telephone assembly 110 is removably and/or fixedly secured to a strap or band 111 having appropriate latch and/or locking structures to removably dispose the band or strap 111 about the wrist or other appropriate portions of the users body. Included within the telephone assembly 110 are the common structural and operative features associated with others of the preferred embodiments of the communication assembly of the present invention, as described herein. Such included components comprise a display assembly 70' which is preferably the form of the aforementioned LCD and a function or control member or button 76' which may include multi-directional scrolling capabilities. Additional structural features of the telephone assembly 110 may include a sensing assembly 112 structured to determine one or more weather characteristics such as the temperature, pressure, altitude, etc., wherein such environmental or whether characteristics may be useful in the performance of athletic activities.

Figure 35:
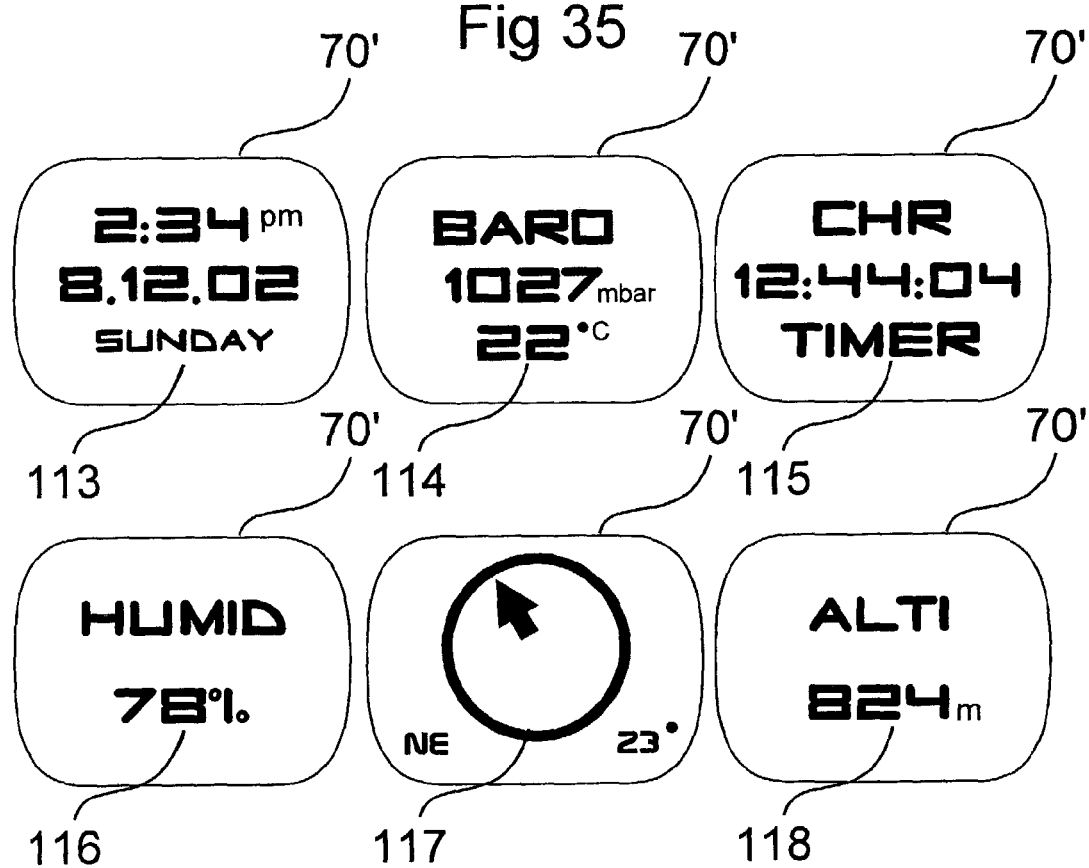
FIG. 35 is a composite view schematically representing the various functions and informational displays associated with the embodiment of FIG. 34.

FIG. 35 is a composite, schematic view of the various informational data or indicia which may be display of the display assembly 70'. Such informative data may include time and date as at 113; pressure and temperature as at 114; a timer structure as at 115; a humidity indicator as at 116; a compass or directional indicator as at 117 and an altimeter as at 118. Further with regard to the preferred embodiment of FIG. 36, as mentioned above, the communication assembly generally indicated as 90 is structured to serve as a combined radio and mobile or cellular telephone. As such, a display screen or assembly 68' also serves as a control member, dialing button, etc. as set forth above and may also serve to display informational indicia, such as relating to specific radio stations being received. Alternatively, when it is desired to use the communication assembly 90 as a cellular telephone, the display assembly 68' serves to visually display any of the aforementioned identifying indicia representative of the entity being called and/or the entity initiating an incoming call. Further, the communication assembly 90 includes the aforementioned scrolling features controlled by manipulation of the functional or multi-directional scrolling member 76'. Moreover, because of its possible combined use as a radio receiver and mobile telephone, the communication assembly 90 is readily adaptable for removable attachment to any of a variety of head set structures 107 applied to the user's head and ear area of a user 94 as clearly depicted in FIG. 36.

As discussed with regard to the embodiment of FIGS. 16 17, and 17A it is recognized that a certain group of potential user's of the communication assembly of the present invention, particularly embodied in a telephone assembly 61, may be visually challenged. Accordingly, as demonstrated in the additional preferred embodiment of FIG. 25 the ability of visually challenged individuals to read the informative indicia 69 on the display assembly 70 is enhanced by enlarging the appearance of such indicia. Such enlargement may occur through the use of the aforementioned magnifier structure or lens 80 or may be built into the processor and/or display capabilities of the telephone assembly 61. Additional enhancement features relating to the understanding of the displayed indicia include an inverted color scheme of the display screen 70. By way of example only the indicia 67 can be demonstrated in a lighter color, such as yellow, and be presented on a darker color background, such as black, of the display assembly or LCD 70. Further, this "color inversion" of the display structure 70 may be selectively regulated by activating the function and/or control member 76 in an appropriate, predetermined manner.

Certain previously described embodiments of the communication assembly of the present invention were directed to a specific group including, but not limited to, visually challenged individuals including the elderly. An additional preferred embodiment of the present invention is shown in FIGS. 26 and 27, wherein the telephone assembly 61 includes voice recognition and voice command capabilities. More specifically, in the preferred embodiment of FIG. 26, digit by digit dialing may be accomplished by the individual 65 pronouncing each numeral of a given telephone number. The individual digits of a given number are audibly entered in their intended sequence. Immediately subsequent to the pronouncement of each digit, a prerecorded or synthetic voice generator of the telephone will repeat the last digit uttered, such as the number 2. Each digit of the telephone number will be repeated in sequence, by the telephone, immediately after pronouncement of the individual digit by the user 65.

Similarly, as in FIG. 27 the voice recognition and voice command capabilities comprise pronouncement of a specific name or identifying term of the entity which the user 65 desires to call. As set forth above, a plurality of calling numbers can be pre-programmed into the storage facilities of the telephone assembly 61 and identified with specific names. By way of example, the user 65 may pronounce the name or term "Al" followed by the voice command "dial". The retrieval capabilities associated with the telephone assembly 61 would thereby retrieve the appropriate calling number identified by the term "Al" and display the pronounced term "Al" and/or the telephone number associated therewith, as at 71 on the display assembly or LCD 70. The specific command "dial" may or may not be required when the individual 65 is sequentially pronouncing each of the numerals in a telephone number, as described with reference to FIG. 26. Alternatively, upon receiving the appropriate quantity of numerals (7 digits plus area code) the processor within the telephone assembly 61 may automatically begin the dialing procedure to establish the desired communication link.

Yet an additional preferred embodiment of the present invention is disclosed in FIGS. 28 and 29 and primarily relates to the "dialing" of a desired telephone number absent the use of any type of keypad. As shown in FIG. 28 the functional control member 76, which is preferably in the form of a multi-directional scrolling button, may scroll or browse through the contact names or terms to locate the desired party to be called. Upon locating the intended contact or party, the identifying name or terms will be displayed as the informational indicia 71 on the LCD or like display assembly 70. Scrolling indicators as at 93 and 93' may also be displayed for convenience, as and indication of the direction of scrolling or browsing through the stored, pre-programmed contact list. Upon locating the intended contact or party, as at 71, the dialing procedure is initiated by exerting a pushing force, or other manipulation of the control or function member 76.

Similarly, as depicted in FIG. 29, a user may wish to call a telephone number which has not been previously programmed into the storage capabilities of the telephone assembly 61'. In such an event, the control or function member 76, being a multi directional browse button, may be manipulated to accomplish a lateral scrolling or travel as indicated by display, directional arrows 95 and 95'. As such, manipulation of the control member 76 will be used to sequentially scroll, in opposite directions through all of the numbers 1 through 0. Selection of the individual numbers can be accomplished by exerting a pushing or pressing force on the control member 76. When the correct quantity and sequence of digits 92 have been selected a speed dialing sequence may be initiated by an additional pressing or pushing on the control member 76. It is further noted that the selected contact name 71 and/or individual numeral 92 may be highlighted by the aforementioned inverse coloring scheme of the selected indicia, numeral, contact number, etc.

The versatility of the communication assembly and in particular the telephone assembly 61 of the present invention is further demonstrated through the ability to perform certain "emergency" services including, but not limited to, the occurrence of a medial emergency. For those individuals which find it difficult or impossible to talk, the embodiment of FIGS. 30 and 31 comprise the ability to pre-program a predetermined message, such as a vocal emergency message or message of other appropriate context. Upon the occurrence of the related emergency event, activation of the telephone assembly 61 such as voice command, as set forth above and/or by a predetermined manipulation of one or more control or function members 70 and/or 76 will instigate transmission of the prerecorded emergency message. By way of example only, an individual may arrange to have any number of messages such as: "I am Julie Grant, my address 3564 North East 407 Street, please help me, I have heart problems." Naturally any type of message can be prerecorded and stored in the telephone assembly 61. The appearance of the indicia such as at 102 on the LCD or like display assembly 70 will assure the individual that the message has been communicated to a predetermined location. Such locations tray include a hospital, doctor, friend, family, 911 emergency service, etc.

Figure 31:
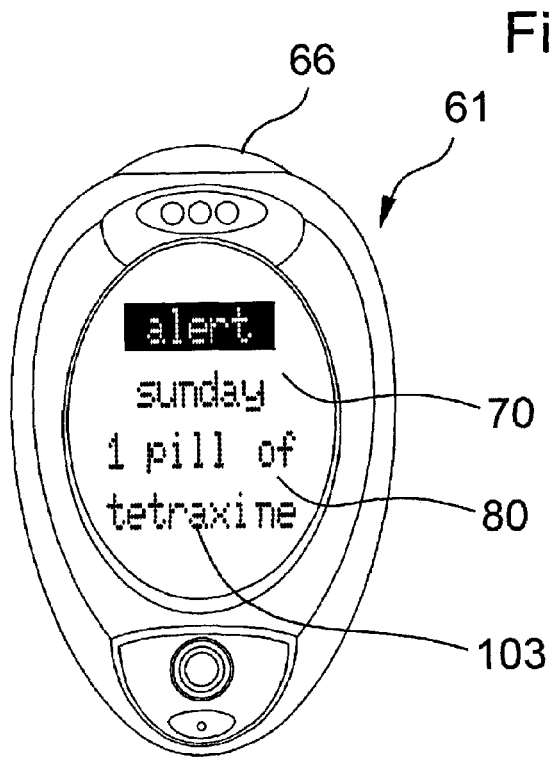

Somewhat similarly and as demonstrated in FIG. 31, medical information in terms of medication, content and schedule of use from a doctor or other medical personnel can be communicated to the telephone assembly 61, as at 103, from a remote location. The telephone assembly 61 will further include alarm/signal and recognition capabilities associated with a time facility. Therefore, when a predetermined time has arrived for the consumption of the medication, a signal or alert mechanism such as the ringing of the telephone assembly 61 and/or the flashing of the display assembly or LCD 70 and/or flashing of the illuminated antenna 66, may automatically occur. The individual for whom the medication is intended will thereby be reminded.

Figure 32:
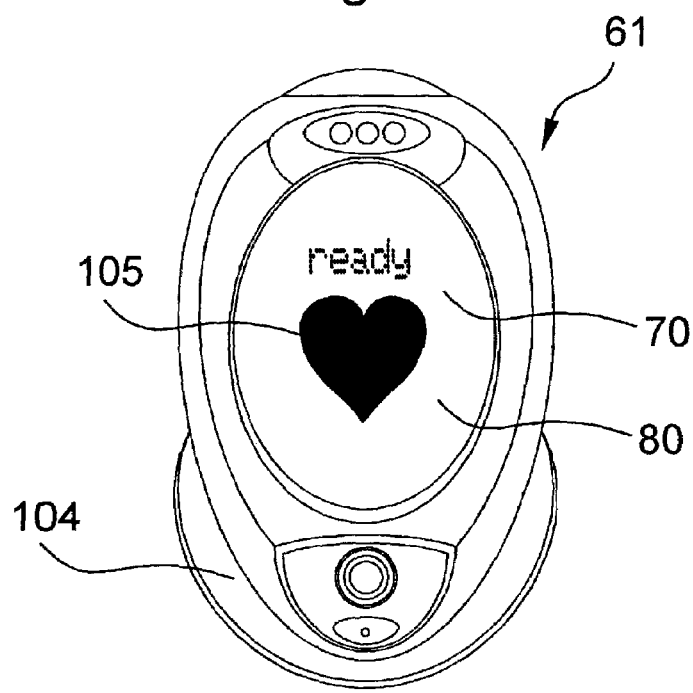
FIG. 32 is a front plan view of yet another preferred embodiment of the present invention wherein a communication device incorporates physiological sensing/analysis capabilities.
Figure 33:
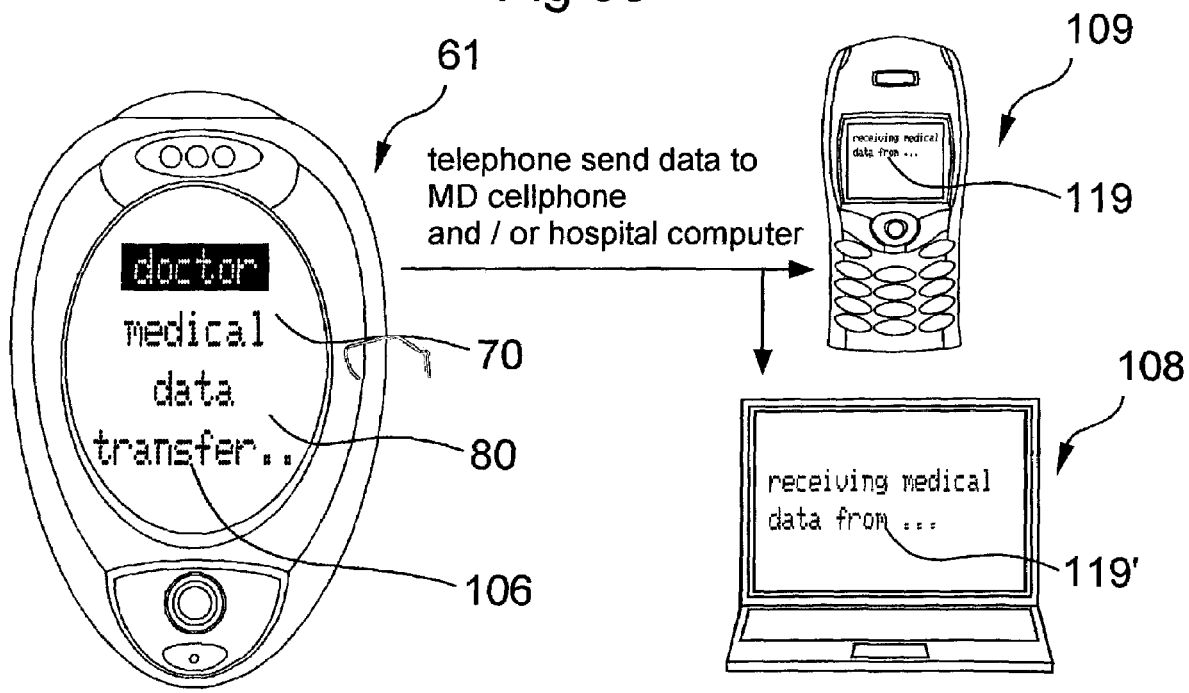
FIG. 33 is a composite view in at least partially schematic form incorporating the functional capabilities of the embodiment of FIG. 32 and further including communication capabilities of determined physiological data.

Related medical emergency and/or the analytical determination of predetermined physiological conditions are further demonstrated in the additional preferred embodiment of FIGS. 32 and 33. As such, the telephone assembly 61 as demonstrated in FIG. 32 may be considered "group specific" by being directed to individuals in need of medical attention. As such, telephone assembly 61 includes a sensor or analysis structure 104 specifically structured to determine physiological characteristics of an individual including, but not limited to, blood pressure, heart rate, temperature, etc. Once determined, the medical data established by the sensor assembly 104 can be transferred to an appropriate individual or entity such as to the computer 108 as at 119' of a hospital or like medical facility or to the cell phone or other communication facility 109 associated with a doctor or like medical personnel as at 119. When initiated or completed, a verification message can be displayed as at 106 on the LCD or like display assembly 70.

Yet another preferred embodiment is demonstrated in FIGS. 37, 37A and 37B wherein a communication or telephone assembly 63 has an elongated, uniquely designed and structured casing which is distinguishable from the size and configuration of the previously described casing of other preferred embodiments of the present invention. As such, the telephone assembly 63 includes an elongated, narrow and transversely slim configuration of the type being capable of fitting within a shirt pocket or other appropriate location on a user's clothing similar to the positioning of a pen or like writing instrument.

Accordingly, a connector or spring biased clip 57 is secured to a rear surface of the telephone assembly 63 and may function in a manner similar to spring biased clips found on writing instruments, such as a pen. Other means of attachment or securement of the telephone assembly 63 includes an upwardly extendable bracket or hook like structure 59 which may rise above, in spaced relation to the upper end of the telephone assembly 63 from its normally stored position as shown in FIG. 37B. The bracket or hook 59 is capable of receiving a key chain or like device of the type disclosed in FIGS. 7B and 7C.

With further regard to FIG. 37B, the telephone assembly 63 may include an interior compartment as at 77' for the housing and storage of a self contained power source, such as replaceable and/or rechargeable batteries. Also, as with the preferred embodiments of FIGS. 15 and 23, quick access, emergency services, control member or button 135' may be provided so as to facilitate quick and easy communication with predetermined emergency facilities or services such as, but not limited to hospital, medical staff, police, etc.

Other features of the telephone assembly 63 includes a speaker 72' and a microphone 74' appropriately located on the casing of the telephone assembly 63. Similarly, a plurality of control and/or function buttons 53 are provided for purposes inserting a telephone calling number and/or for activating or controlling other operative features of the telephone assembly 63. In addition a multi-directional scrolling button or control member 76' is also provided on the front or exposed face of the telephone assembly 63.

Yet another structural and operative feature of the telephone assembly 63 comprises an elongated display screen 70' which, as set forth above, may be in the form of an LCD or like display. As such, the cover member which may be in the form of magnifier structure or lens 80' can be disposed in fixed or removable, overlying relation to the display structure 75 for purposes of facilitating viewing of display the data 71' in an enlarged format. Also automatic display capabilities include the display data 71' being oriented in the column like presentation of FIG. 37 wherein the individual display items, such as the names "Allen", "Albert", etc. are individually oriented in transverse relation to the length of the display structure or screen 70'. However, depending on the content of the displayed information 71', as at 41 and 67' disclosed in FIG. 37A, the orientation of the displayed information 71' will be changed to extend along the length of the display assembly 70'.

More specifically and by way of example, a user may locate the one of a plurality of different entities such as "Albert" by vertically scrolling along the plurality of stored names 71' using the multi-directional scrolling button 76'. When the desired party is located the scrolling button 761' or other function buttons as at 53 may be depressed. The result will be a display of the chosen entities telephone number including each of the plurality of numerals 41 defining the displayed information 71'. Further, the information and/or the plurality of numerals 41 will be enhanced in size as indicated as 67' and automatically extend longitudinally along the length of the display assembly 70' to further facilitate viewing, either as a convenience or as a necessary, such as with the visually challenged or elderly.

Common to all or predetermined, individual ones of the above described preferred embodiments are any of a variety of different operational characteristics regardless of the form, configuration and dimension of the communication assembly and/or the casing or housing with which it is used. Such operational features are, in many instances, "group specific" by being intended for use by a specific group of individuals. The various features may include a high output signal/ring tone for the hearing impaired, repeated illuminated flashing signals of various components of the telephone assembly, such as the display screen, antenna or individualized dialing buttons, as well as the enhanced visual presentation, for the visually challenged, of the informative indicia appearing on the display assembly or LCD.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:
1. A telephone assembly comprising:
 a) a casing including a cover plate mounted thereon in an exposed position,
 b) said cover plate comprising a plurality of windows extending therethrough, said plurality of windows collectively and at least partially defining a predetermined display,
 c) a control assembly including a plurality of control members disposed on said casing and structured for selective operation of the telephone assembly, and d) at least some of said plurality of control members being cooperatively disposed with said plurality of windows to define accessible positioning thereof while at least partially defining said predetermined display with said plurality of windows.

2. A telephone assembly as recited in claim 1 wherein at least some of said plurality of control members are selectively accessible through a corresponding one of said plurality of windows.

3. A telephone assembly as recited in claim 2 wherein others of said plurality of control members are spaced apart from said plurality of windows.

4. A telephone assembly as recited in claim 2 wherein said plurality of windows and respective ones of said plurality of control members are correspondingly dimensioned and configured.

5. A telephone assembly as recited in claim 4 wherein said respective ones of said plurality of control members are movably mounted within corresponding ones of said plurality of windows.

6. A telephone assembly as recited in claim 5 wherein said respective ones of said plurality of control members comprise dialing buttons selectively operable by a user to move within and relative to corresponding ones of said plurality of windows.

7. A telephone assembly as recited in claim 6 wherein each of said plurality of dialing buttons are operative for individual, pre-set calling numbers.

8. A telephone assembly as recited in claim 6 wherein each of said plurality of dialing buttons comprises identifying indicia viewable thereon.

9. A telephone assembly as recited in claim 8 wherein each of said identifying indicia corresponds to an identity of a specific calling number.

10. A telephone assembly as recited in claim 9 wherein others of said plurality of control members comprise a plurality of function buttons spaced apart from said plurality of windows and structured for operational programing of the telephone assembly.

11. A telephone assembly as recited in claim 10 wherein said plurality of dialing buttons, said plurality of windows and said plurality of function buttons collectively and at least partially define said predetermined display.

12. A telephone assembly as recited in claim 11 wherein said predetermined display is configured to represent facial characteristics.

13. A telephone assembly as recited in claim 12 wherein said facial characteristics substantially corresponds to a clown face.

14. A telephone assembly as recited in claim 1 wherein said predetermined display is configured to represent facial characteristics.

15. A telephone assembly as recited in claim 14 wherein said facial characteristics substantially correspond to a clown face.

16. A telephone assembly as recited in claim 14 wherein a first number of said control members are accessibly mounted within said plurality of windows, at least some of said first number of control members including identifying indicia displayed thereon.

17. A telephone assembly as recited in claim 16 wherein each of said identifying indicia corresponds to an identity of a specific calling number.

18. A telephone assembly as recited in claim 16 wherein said plurality of windows, said first number of control members and said identifying indicia collectively and at least partially define said facial characteristics.

19. A telephone assembly as recited in claim 18 wherein a second number of said plurality of control members are spaced apart from said plurality of windows and also at least partially define said predetermined display.

20. A telephone assembly as recited in claim 19 further comprising an antenna structure extending outwardly from said casing and also configured to at least partially define said predetermined display.

21. A telephone assembly as recited in claim 1 wherein said cover plate is removably mounted on said casing and comprises one of a plurality of replaceable cover plates.

22. A communication assembly comprising:
a) a casing including a cover plate mounted thereon in an exposed position,
b) a control assembly including a plurality of control members disposed and structured to operate the communication assembly,
c) said cover plate including a plurality of windows cooperatively structured with correspondingly disposed ones of said plurality of control members to facilitate visual and physical access to said correspondingly disposed control members, and
d) said plurality of windows and said plurality of control members cooperatively disposed and configured to at least partially define a predetermined display substantially representative of facial characteristics.

23. A communication assembly as recited in claim 22 wherein said plurality of control members comprise dialing buttons.

24. A communication assembly as recited in claim 22 wherein said plurality of control members comprise function buttons.

25. A communication assembly as recited in claim 22 wherein said plurality of control members comprise at least one indicator structure.

26. A communication assembly as recited in claim 22 wherein said predetermined display is further defined by a speaker structure.

27. A communication assembly as recited in claim 22 wherein said predetermined display is further defined by a microphone structure.

28. A communication assembly as recited in claim 22 further comprising identifying indicia formed on at least some of said control members, said identifying indicia comprising a pictorial display representative of predetermined entities.

29. A communication assembly as recited in claim 22 further comprising an antenna structure disposed and configured as an integrated part of said predetermined display.

30. A communication assembly comprising:
a) a portable casing including a cover plate mounted thereon in an exposed position,
b) a control assembly including at least one control member disposed and structured to operate the communication assembly,
c) said cover plate including at least one window cooperatively structured and disposed with said one control member to facilitate visual and physical access thereto, and
d) a display assembly associated with said one control member and structured to display identifying indicia representative of a predetermined entity.

31. A communication assembly as recited in claim 30 wherein said display assembly comprises a display screen integrated in said control member and structured to display said identifying indicia.

32. A communication assembly as recited in claim 31 wherein said identifying indicia comprises a pictorial display of said predetermined entity viewable on said display screen.

33. A communication assembly as recited in claim 31 comprising a telephone structured to include caller identification capabilities, said predetermined entity comprising an incoming calling identity.

34. A communication assembly as recited in claim 31 wherein said identifying indicia comprises a pictorial display of said predetermined entity viewable on said display screen.

35. A communication assembly as recited in claim 31 wherein said communication device comprises a telephone structured to store a plurality of calling numbers, said telephone further structured to include scrolling capabilities operable by said control assembly.

36. A communication assembly as recited in claim 35 wherein said control assembly is operatively connected to said display assembly to selectively scroll said plurality of stored calling numbers each being independently viewable as said identifying indicia on said display screen.

37. A communication assembly as recited in claim 36 wherein said plurality of calling numbers are represented as pictorial displays on said display screen.

38. A communication assembly as recited in claim 31 comprising a radio, said identifying indicia displayed on said display screen comprising a radio station.

* * * * *